(12) United States Patent
Johnson

(10) Patent No.: US 11,387,639 B2
(45) Date of Patent: Jul. 12, 2022

(54) ELECTRICAL BOX CABLE CONNECTOR

(71) Applicant: Hubbell Incorporated, Shelton, CT (US)

(72) Inventor: Steven James Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/508,567

(22) Filed: Jul. 11, 2019

(65) Prior Publication Data
US 2020/0021094 A1 Jan. 16, 2020

Related U.S. Application Data

(60) Provisional application No. 62/696,647, filed on Jul. 11, 2018.

(51) Int. Cl.
*H02G 3/16* (2006.01)
*H02G 3/14* (2006.01)
*H02G 3/08* (2006.01)

(52) U.S. Cl.
CPC ............... *H02G 3/16* (2013.01); *H02G 3/085* (2013.01); *H02G 3/14* (2013.01)

(58) Field of Classification Search
CPC ........ H02G 3/0691; H02G 3/085; H02G 3/16; H02G 3/14; H02G 3/08; H02G 3/83; H02G 3/086; H05K 5/0247
(Continued)

(56) References Cited

U.S. PATENT DOCUMENTS 2,708,122 A 5/1955 Clark
2,967,722 A 1/1961 Lifka
(Continued)

OTHER PUBLICATIONS

International Search Report and Written Opinion dated Oct. 2, 2019 in corresponding PCT/US2029/41310.
(Continued)

*Primary Examiner* — Timothy J Thompson
*Assistant Examiner* — Guillermo J Egoavil
(74) *Attorney, Agent, or Firm* — Wissing Miller LLP

(57) ABSTRACT

An electrical box assembly having an electrical box and a cable connector is provided. The cable connector includes a mounting bracket cable retaining member and a cable stop. The mounting bracket is secured to or integral with a side wall of the electrical box. The cable retaining member is secured to the mounting bracket and has a cable gripping portion extending into a cable receiving zone of the box. The cable stop extends from a bottom wall of the electrical box into the cable receiving zone. The cable stop permits one or more electrical wires from an electrical cable to pass through the cable stop while blocking sheathing of the electrical cable from passing through the cable stop. The cable gripping portion can engage the electrical cable inserted into the cable receiving zone from an exterior of the electrical box so that the cable retaining member is able to flex while the electrical cable passes into the cable receiving zone imparting little resistance to the forward advancement or movement of the electrical cable within the cable receiving zone, while imparting sufficient resistance to rearward movement of the electrical cable to prevent withdrawal of the electrical cable from the cable receiving zone.

24 Claims, 24 Drawing Sheets

(58) Field of Classification Search
USPC .......................................... 174/500, 64, 60
See application file for complete search history.

(56) References Cited

U.S. PATENT DOCUMENTS

| | | |
|---|---|---|
| 2,973,212 A | 2/1961 | Rose |
| 3,006,661 A | 10/1961 | McNeill |
| 3,082,023 A * | 3/1963 | Rudolph ................ H02G 3/065 |
| | | 174/663 |
| 3,858,151 A | 12/1974 | Paskert |
| 4,012,578 A | 3/1977 | Moran et al. |
| 4,190,222 A | 2/1980 | Appleton et al. |
| 4,299,363 A | 11/1981 | Datschefski |
| 4,302,035 A | 11/1981 | Ochwat |
| 4,304,957 A | 12/1981 | Slater et al. |
| 4,306,109 A | 12/1981 | Nattel |
| 4,350,839 A | 9/1982 | Lass |
| 4,361,302 A | 11/1982 | Lass |
| 4,605,816 A | 8/1986 | Jorgensen et al. |
| 4,640,433 A | 2/1987 | Jorgensen et al. |
| 4,880,387 A | 11/1989 | Stikeleather et al. |
| 4,885,429 A | 12/1989 | Schnittker |
| 4,990,721 A | 2/1991 | Sheehan |
| 5,013,872 A * | 5/1991 | Lockwood .......... H02G 3/0675 |
| | | 174/663 |
| 5,118,057 A | 6/1992 | Martin et al. |
| 5,241,136 A | 8/1993 | Michaelis |
| 5,285,013 A | 2/1994 | Schnell et al. |
| 5,374,017 A | 12/1994 | Martin et al. |
| 5,422,437 A | 6/1995 | Schnell |
| 5,442,141 A | 8/1995 | Gretz |
| 5,594,207 A | 1/1997 | Fabian et al. |
| 5,607,323 A | 3/1997 | Foster et al. |
| 5,789,706 A | 8/1998 | Perkins |
| 6,043,432 A | 3/2000 | Gretz |
| 6,080,933 A | 6/2000 | Gretz |
| 6,091,023 A | 7/2000 | O'Donnell |
| 6,114,630 A | 9/2000 | Gretz |
| 6,140,582 A * | 10/2000 | Sheehan .............. H02G 3/0691 |
| | | 16/2.2 |
| 6,143,982 A | 11/2000 | Gretz |
| 6,175,078 B1 | 1/2001 | Bambardekar |
| 6,335,488 B1 | 1/2002 | Gretz |
| 6,380,483 B1 | 4/2002 | Blake |
| 6,395,981 B1 | 5/2002 | Ford et al. |
| 6,444,907 B1 | 9/2002 | Kiely et al. |
| 6,604,400 B1 | 8/2003 | Gretz |
| 6,670,553 B1 | 12/2003 | Gretz |
| 6,682,335 B2 | 1/2004 | Gretz |
| 6,709,280 B1 | 3/2004 | Gretz |
| 6,768,057 B2 | 7/2004 | Blake |
| 6,780,029 B1 | 8/2004 | Gretz |
| 6,849,803 B1 | 2/2005 | Gretz |
| 7,154,042 B2 | 12/2006 | Auray et al. |
| 7,154,054 B1 | 12/2006 | Gretz |
| 7,214,890 B2 | 5/2007 | Kiely et al. |
| 7,226,309 B1 | 6/2007 | Gretz |
| 7,238,894 B1 | 7/2007 | Gretz |
| 7,304,251 B1 | 12/2007 | Gretz |
| 7,329,144 B1 | 2/2008 | Gretz |
| 7,390,979 B1 | 6/2008 | Johnson |
| 7,432,443 B2 | 10/2008 | Johnson |
| 7,459,643 B2 | 12/2008 | de la Borbolla |
| 7,495,184 B1 | 2/2009 | Gretz |
| 7,576,290 B1 | 8/2009 | Korcz et al. |
| 7,645,947 B2 | 1/2010 | Kiely et al. |
| 7,824,213 B1 | 11/2010 | Korcz et al. |
| 7,922,020 B2 | 4/2011 | Wronski |
| 8,124,891 B1 | 2/2012 | Gretz |
| 8,646,813 B1 | 2/2014 | Shemtov |
| 8,664,543 B2 | 3/2014 | Chen |
| 8,759,674 B2 | 6/2014 | Korcz et al. |
| 8,791,374 B1 | 7/2014 | Smith |
| 8,816,222 B2 | 8/2014 | Pimentel |
| 9,247,662 B2 | 1/2016 | Korcz et al. |
| 9,252,578 B2 | 2/2016 | Korcz et al. |
| 9,425,596 B2 | 8/2016 | Laverdiere et al. |
| 9,553,415 B2 | 1/2017 | Gretz |
| 9,553,432 B2 | 1/2017 | Korcz et al. |
| 9,559,506 B2 | 1/2017 | Korcz et al. |
| 9,614,358 B2 | 4/2017 | Korcz et al. |
| 9,762,042 B2 | 9/2017 | Korcz et al. |
| 9,929,551 B2 | 3/2018 | Korcz et al. |
| 10,158,216 B2 | 12/2018 | Korcz et al. |
| 2004/0012276 A1 | 1/2004 | Okamoto et al. |
| 2006/0005988 A1 | 1/2006 | Jorgensen |
| 2006/0272142 A1 | 12/2006 | Johnson |
| 2007/0261881 A1 | 11/2007 | Wronski |
| 2008/0230267 A1 | 9/2008 | de la Borbolla |
| 2008/0296061 A1 | 12/2008 | Kerr, Jr. |
| 2009/0111337 A1 | 4/2009 | Kiely |
| 2009/0205865 A1 | 8/2009 | Korcz et al. |
| 2010/0000756 A1 | 1/2010 | Peck |
| 2011/0204619 A1 | 8/2011 | Sathyanaryana et al. |
| 2011/0209913 A1 | 9/2011 | Green et al. |
| 2011/0290550 A1 | 12/2011 | Kiely |
| 2013/0153265 A1 | 6/2013 | Chen |
| 2013/0233515 A1 | 9/2013 | Pimentel |
| 2014/0262486 A1* | 9/2014 | Korcz .................. H02G 3/0691 |
| | | 174/520 |
| 2014/0262488 A1* | 9/2014 | Korcz .................... H02G 3/083 |
| | | 174/535 |
| 2015/0090488 A1 | 4/2015 | Laverdiere et al. |
| 2015/0357806 A1 | 12/2015 | Korcz et al. |
| 2016/0099554 A1 | 4/2016 | Korcz et al. |
| 2016/0105011 A1 | 4/2016 | Korcz et al. |
| 2017/0125991 A1* | 5/2017 | Korcz .................. H02G 3/0691 |
| 2017/0207571 A1 | 7/2017 | Korcz et al. |
| 2017/0323745 A1* | 11/2017 | Cohen .................... H01H 29/08 |
| 2019/0115736 A1* | 4/2019 | Korcz .................. H02G 3/0691 |

OTHER PUBLICATIONS

Arlington Industries Brochure, 90 degrees Snap2It (R) MC Fable Connectors, 2014.
International Preliminary Report of Patentability dated Jan. 21, 2021 in corresponding PCT/US2019/041310 (12 pages).

* cited by examiner

ELECTRICAL BOX CABLE CONNECTOR

CROSS REFERENCE TO RELATED APPLICATIONS

The present disclosure is based on and claims benefit from co-pending U.S. Provisional Patent Application Ser. No. 62/696,647 filed on Jul. 11, 2018 entitled "Electrical Box Cable Connector" the contents of which are incorporated herein in their entirety by reference.

BACKGROUND

Field

The present disclosure relates generally to electrical box assemblies for housing electrical cables and electrical cable connector assemblies that can be installed in electrical boxes or integrally formed into electrical boxes. More particularly, the present disclosure relates to electrical box assemblies with one or more electrical cable connector assemblies that can be pre-installed within an electrical box or installed in an electrical box in the field.

Description of the Related Art

Electrical boxes are mounted in various residential, commercial, and industrial locations depending on the particular application. Electrical cables are commonly supplied to such electrical boxes and are used for connecting a cable to electrical devices or fixtures or other electrical cables. Current electrical codes typically require electrical cabling to be secured to the electrical boxes. In some electrical box configurations, the electrical cables generally pass through an opening in a wall of an electrical box, also known as a knock-out or a pry-out, and are secured in place by a cable connector or clamp. Conventional cable clamps for armored sheathed cabling differ from cable clamps for non-metallic sheathed cabling, but in either case, such conventional cable clamps generally clamp the cable between a plate that is screwed into a side wall or bottom wall of the electrical box and compresses the cable between the plate and the side wall or bottom wall. Conventional cable clamps for armored sheathed cabling, typically include a stop member to prevent the armored sheath from extending too far into the electrical box.

SUMMARY

The present disclosure provides descriptions of embodiments for electrical box assemblies with one or more electrical cable connector assemblies that can be pre-installed within an electrical box or installed within an electrical box in the field. The electrical boxes contemplated by the present disclosure can be made of a metallic material, a non-metallic material including, such as injection molded thermoplastic, or a combination thereof.

In one exemplary embodiment, the electrical box assembly includes an electrical box and at least one connector cable assembly. The electrical box has a plurality of side walls, a bottom wall and at least one cable receiving zone. The at least one connector cable assembly is positioned within the cable receiving zone of the electrical box. The connector cable assembly includes a mounting member, e.g., a mounting bracket, a cable retaining member and a cable stop. The mounting member is secured to or integral formed into one of the plurality of side walls of the electrical box. The cable retaining member is secured to the mounting member and has a cable gripping portion extending into the cable receiving zone of the electrical box. The cable stop extends from the bottom wall of the electrical box into the cable receiving zone, and is configured and dimensioned to permit one or more electrical wires from an electrical cable to pass through the cable stop while blocking sheathing of the electrical cable from passing through the cable stop. In this configuration, the cable gripping portion can engage the electrical cable inserted into the cable receiving zone from an exterior of the electrical box so that the cable retaining member is able to flex while the electrical cable passes into the cable receiving zone imparting little resistance to the forward advancement or movement of the electrical cable within the cable receiving zone, while imparting sufficient resistance on the cable preventing rearward movement of the electrical cable to prevent withdrawal of the electrical cable from the cable receiving zone.

In an exemplary embodiment, the cable retaining member includes a base portion releasably secured to the mounting member and at least one leg extending from the base portion into the cable receiving zone. The at least one leg includes a cable gripping portion for engaging the sheathing of the electrical cable. In some embodiments, the cable retaining member includes a base portion releasably secured to the mounting bracket, a first leg extending from one end of the base portion into the cable receiving zone and a second leg extending from another end of the base portion into the cable receiving zone. The cable retaining member can be releasably secured to the mounting member by a fastener, such as a mechanical fastener, or the cable retaining member can be releasably secured to the mounting member by a wedge fit, friction fit or pressure fit. In another embodiment, the cable retaining member can be permanently secured to the mounting member or integrally formed into the mounting member.

In another exemplary embodiment, the electrical box assembly includes an electrical box and at least one connector cable assembly. The electrical box has a plurality of side walls, a bottom wall and at least one cable receiving zone. The at least one connector cable assembly is positioned at least partially within the cable receiving zone of the electrical box. The connector cable assembly includes a mounting member, a cable retaining member and a cable stop. The mounting member is secured to or integral with one of the plurality of side walls of the electrical box. The cable retaining member has a base portion secured to the mounting member and at least one leg extending from the base portion such that at least a cable gripping portion of the leg is in the cable receiving zone. The cable stop extends from the bottom wall of the electrical box into the cable receiving zone. The cable stop permits one or more electrical wires from an electrical cable to pass through the cable stop while blocking sheathing of the electrical cable from passing through the cable stop. In this configuration, the cable gripping portion can engage the electrical cable when inserted into the cable receiving zone from an exterior of the electrical box so that the leg is able to flex while the electrical cable moves in the cable receiving zone imparting little resistance to the forward movement of the electrical cable within the cable receiving zone, while imparting sufficient resistance on the cable preventing rearward movement of the electrical cable to prevent withdrawal of the electrical cable from the cable receiving zone.

In another exemplary embodiment, the electrical box assembly includes an electrical box and at least one connector cable assembly. The electrical box has a plurality of side walls, a bottom wall and at least one cable receiving zone. The at least one connector cable assembly is positioned at least partially within the cable receiving zone of the electrical box. The at least one connector cable assembly includes a cable retaining member and a cable stop. The cable retaining member has a base portion secured to or integrally formed into one of the plurality of side walls of the electrical box, and at least one leg extending from the base portion such that at least a cable gripping portion of the leg is in the cable receiving zone. The cable stop extends from the bottom wall of the electrical box into the cable receiving zone. The cable stop is configured to permit one or more electrical wires from an electrical cable to pass through the cable stop while blocking sheathing of the electrical cable from passing through the cable stop. In this configuration, the cable gripping portion can engage the electrical cable when inserted into the cable receiving zone from an exterior of the electrical box so that the leg is able to flex while the electrical cable moves in the cable receiving zone imparting little resistance to the forward movement of the electrical cable within the cable receiving zone, while imparting sufficient resistance on the cable preventing rearward movement of the electrical cable to prevent withdrawal of the electrical cable from the cable receiving zone.

In other exemplary embodiments, the electrical box assembly includes an electrical box and a plurality of connector cable assemblies. The electrical box and connector cable assemblies are similar to the embodiments described above.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

The present disclosure provides descriptions of embodiments for electrical box assemblies with one or more electrical cable connector assemblies that can be pre-installed within an electrical box or installed within an electrical box in the field. The specification and drawings are to be regarded in an illustrative sense rather than a restrictive sense. Various modifications may be made thereto without departing from the spirit and scope of the present disclosure.

Figure 1:
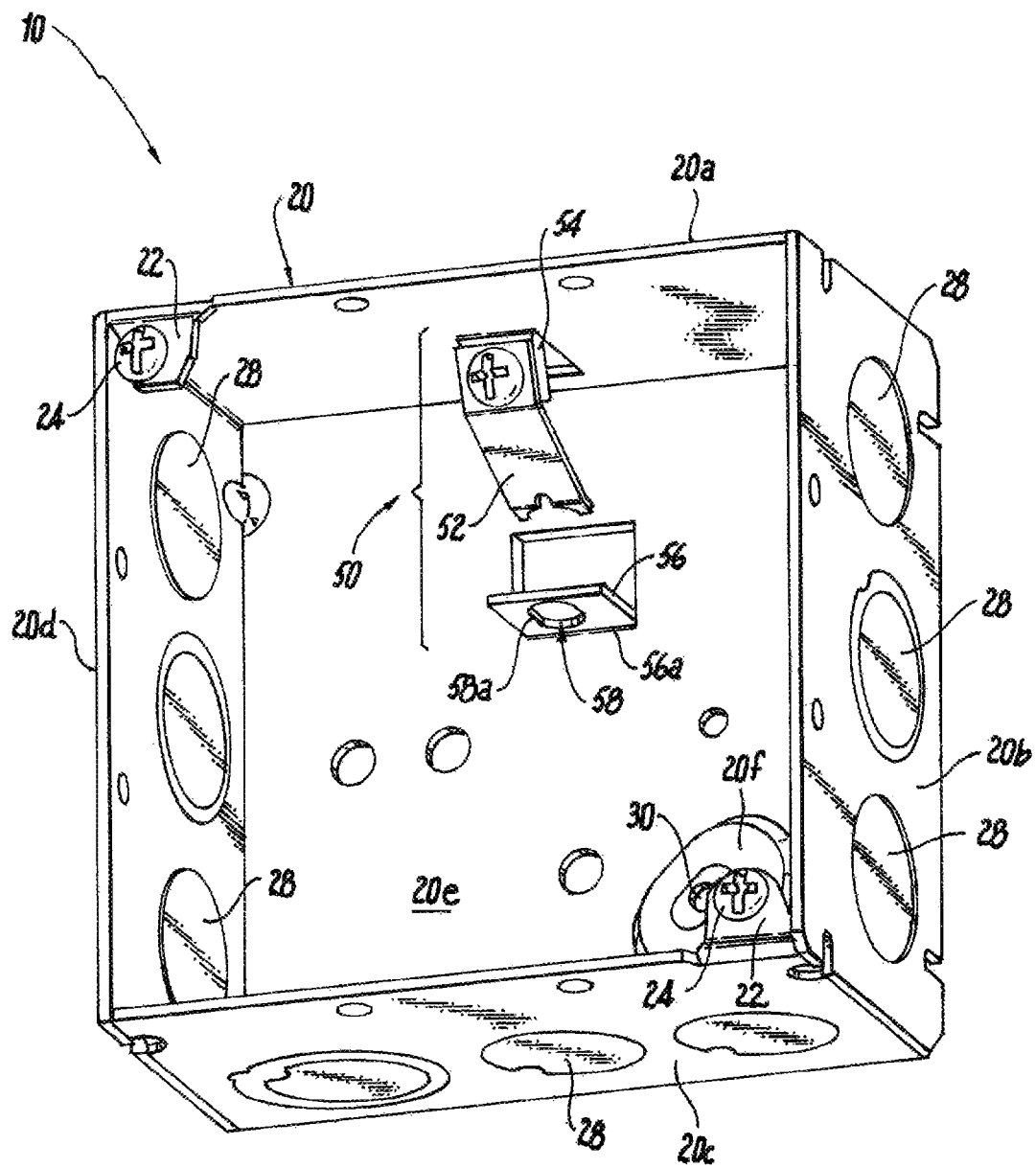
FIG. 1 is a perspective view of an exemplary embodiment of an electrical box assembly according to the present disclosure, illustrating an electrical box and a single cable connector assembly positioned within the electrical box.
Figure 2:
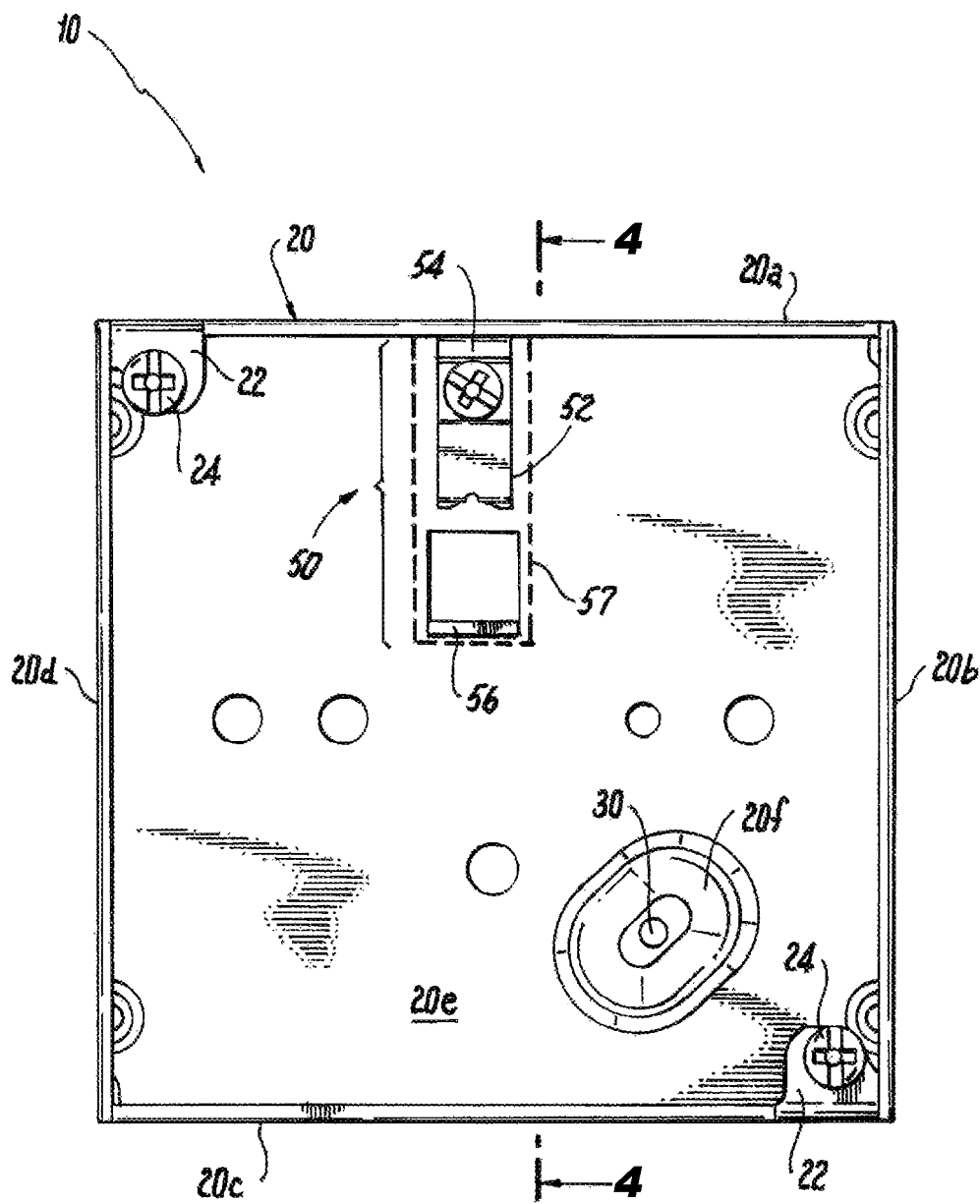
FIG. 2 is a top plan view of the electrical box assembly of FIG. 1.

Referring to FIGS. 1-8, an exemplary embodiment of an electrical box assembly according to the present disclosure is shown. In this exemplary embodiment, the electrical box assembly 10 includes an electrical box 20 and one or more cable connector assemblies 50 (also referred to as a cable clamp) installed or positioned within the electrical box 20. In this exemplary embodiment, the electrical box 20 has four sides 20a-20d and a bottom 20e. The electrical box 20 can be fabricated from metal, e.g., steel or galvanized steel, or from non-metallic materials. A non-limiting example of a suitable non-metallic material is a plastic material. An example of a suitable plastic material is injection molded thermoplastic. In the embodiment shown in FIG. 1-4, the electrical box 20 is a conventional 4×4 square box (or what is also known in the industry as a 4" square box or a 1900 box), however any suitable sized electrical box may be used for the present disclosure. As non-limiting examples, the size of the electrical box includes single gang and/or multi-gang boxes, such as a 3-gang box or raceways. Further, the depth of the electrical box 20 may vary. As non-limiting examples, the depth of the electrical box may be 1¼ inches, 1½ inches, 2⅛ inches or 3½ inches in depth. The electrical box 20 may also include one or more mounting tabs 22 with threaded or tapped mounting holes, where threaded screws 24 (e.g., 8/32 machine screws) can be inserted to secure a cover 20g, seen in FIG. 8, or to secure an extension ring or plaster ring to the electrical box 20. Non-limiting examples of covers include blank covers, switch covers and receptacle covers. The electrical box 20 may include one or more cable entrance pry-outs 26, seen in FIG. 3, that when removed create an opening in the electrical box 20 to permit electrical cables to be inserted into the electrical box 20. The electrical box 20 may also include one or more knock-outs 28, seen in FIG. 1, used to secure known cable clamps or cable connectors to the box housing. The knock-outs 28 can come in many sizes. For example, the knock-outs 28 can be ½ inch, ¾ inch, 1 inch or greater in diameter. To connect the electrical box 20 to electrical ground, a ground screw aperture 30 may be included in the electrical box 20. In conventional 4×4 electrical boxes, the ground screw aperture is typically on a raised surface 20f of the bottom 20e of the electrical box 20, as seen in FIG. 1. The ground screw aperture 30 is typically a threaded or tapped hole for insertion of a ground screw, e.g., an 8/32 machine screw, that is typically color coded as green.

Continuing to refer to FIGS. 1-8, an exemplary embodiment of a cable connector assembly 50 according to the present disclosure includes a cable retaining member 52, a mounting bracket 54 and a cable stop 56. For ease of description the cable retaining member may be referred to as the "retaining member" in the singular and as the "retaining members" in the plural. The retaining member 52 may be provided in various shapes and sizes sufficient to flex while an electrical cable passes into the electrical box imparting little resistance to the forward advancement or movement of the cable while imparting sufficient resistance on the cable preventing rearward movement of the cable to prevent withdrawal of the cable from the electrical box. The area around the cable connector assembly 50 illustrated by the dashed lines is referred to herein as a cable receiving zone 57, seen in FIG. 2. The cable receiving zone 57 of the electrical box 20 is the area from a side wall of the electrical box in proximity to the cable connector assembly 50 where an electrical cable can be positioned for clamping to the electrical box 20.

Figure 4:
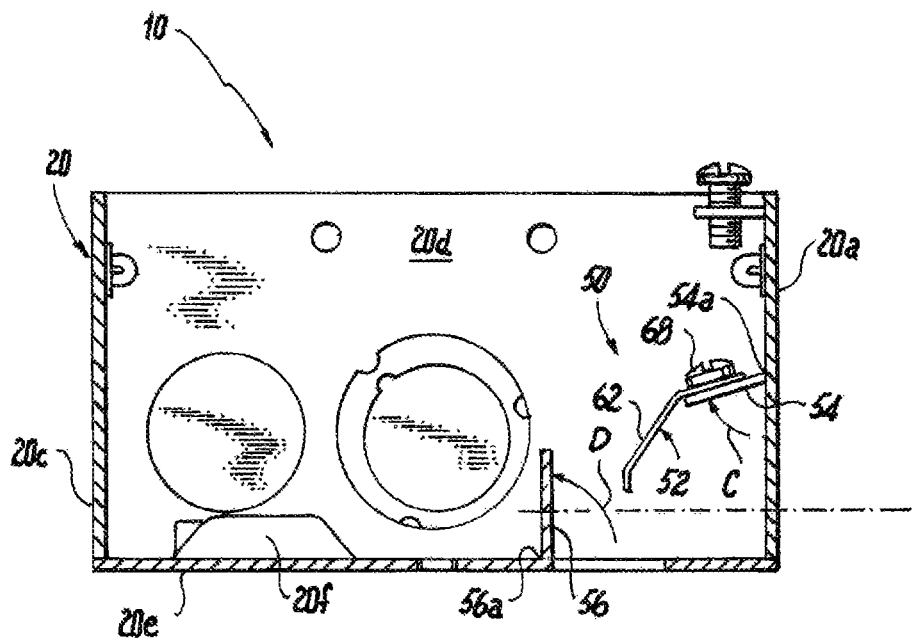
FIG. 4 is a cross-sectional view of the electrical box assembly of FIG. 2 taken from line 4-4 and illustrating an exemplary embodiment of a cable connector assembly according to the present disclosure.
Figure 5:
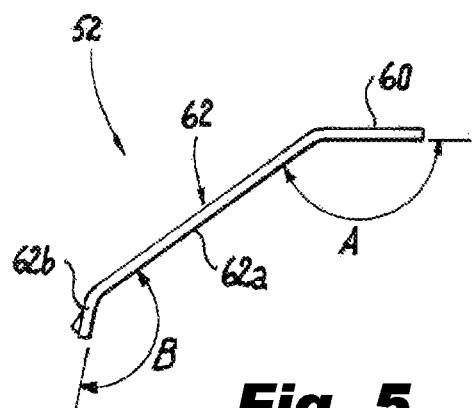
FIG. 5 is a side elevation view of an exemplary embodiment of a retaining member of the cable connector assembly of FIG. 4.
Figure 6:
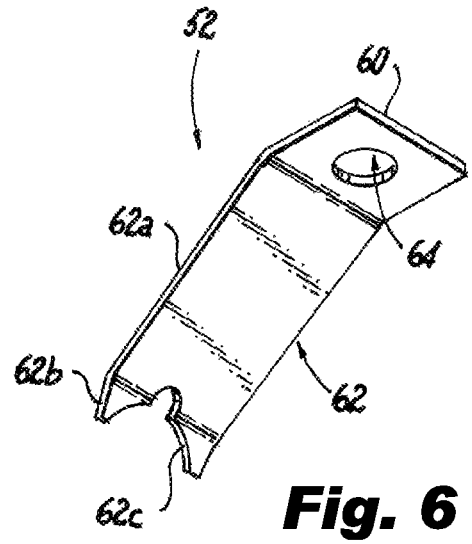
FIG. 6 is a perspective view from the bottom of the retaining member of FIG. 5.
Figure 7:
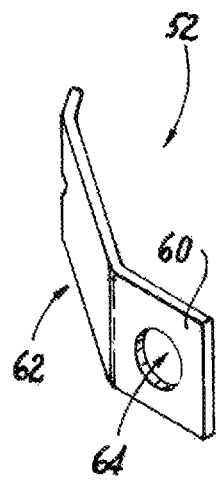
FIG. 7 is a perspective view from a top surface of the retaining member of FIG. 5.
Figure 4A:
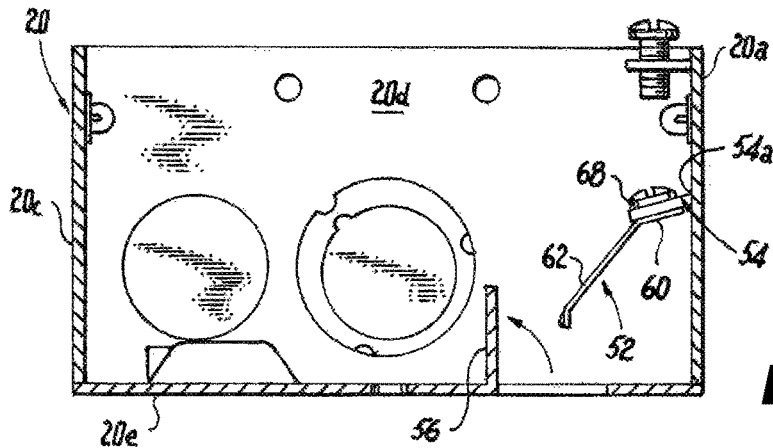
FIG. 4A is a cross-sectional view of the electrical box assembly of FIG. 2 similar to FIG. 4 and illustrating another exemplary embodiment of a cable connector assembly according to the present disclosure.

Referring to FIGS. 5-7, an exemplary embodiment of the retaining member 52 includes a base portion 60 and one or more legs 62 extending from the base portion 60. The base portion 60 is generally straight and may include an aperture 64 used in securing the retaining member 52 to the mounting bracket 54. The base portion 60 may be secured to a top surface of the mounting bracket 54, as seen in FIG. 4, or to a bottom surface of the mounting bracket 54, as seen in FIG. 4A. In an embodiment where the cable retaining member 52 is integrally formed into the mounting bracket 54, the base portion 60 of the cable retaining member 52 would be integral with or monolithically formed into the mounting bracket 54 and the one or more legs 62 would extend from the mounting bracket 54. In an embodiment where the cable retaining member 52 is secured to or integrally formed into a side wall of the electrical box, the base portion 60 of the cable retaining member 52 would be fastened to or integral with or monolithically formed into the side wall of the electrical box and the one or more legs 62 would extend from the side wall.

Figure 4B:
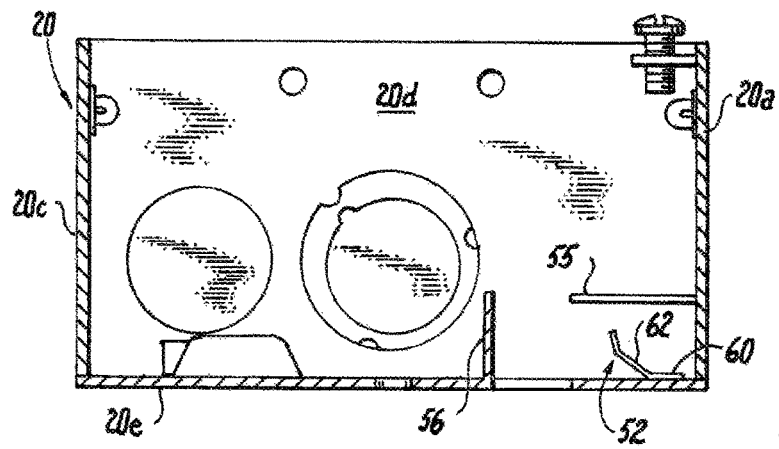
FIG. 4B is a cross-sectional view of the electrical box assembly of FIG. 2 similar to FIG. 4 and illustrating another exemplary embodiment of a cable connector assembly according to the present disclosure.
Figure 4C:
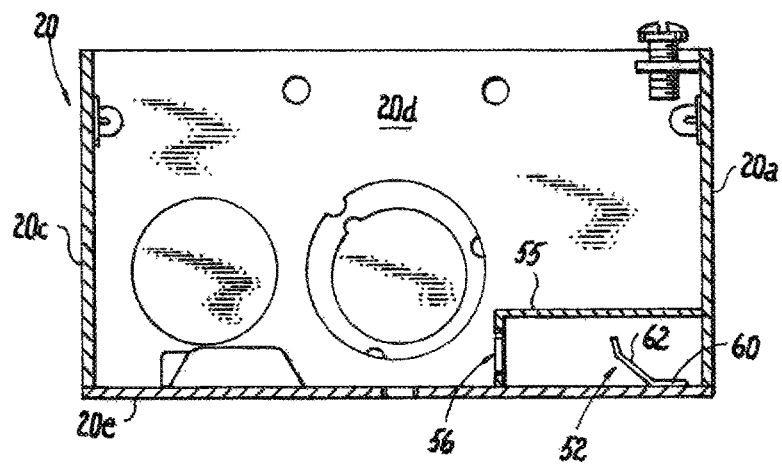
FIG. 4C is a cross-sectional view of the electrical box assembly of FIG. 2 similar to FIG. 4 and illustrating another exemplary embodiment of a cable connector assembly according to the present disclosure.

Referring to FIGS. 4B and 4C, additional exemplary embodiments the base portion 60 of the retaining member 52 may be fastened to or integral with or monolithically formed into the bottom wall 20e of the electrical box, and a cable support wall 55 is fastened to or integral with or monolithically formed into a side wall, e.g., side wall 20a, of the electrical box, as shown. The cable support wall 55 is provided to act as a stop to limit movement of a cable 510 when inserted into the cable receiving zone 57 and engaged by the retaining member 52. The cable support wall 55 may be a partial wall, as shown in FIG. 4B, or the cable support wall 55 may extend from the side wall of the electrical box to the cable stop 56 or the cable support wall 55 may be fastened to, integral with or monolithically formed into the cable stop 56 as shown in FIG. 4C.

In the exemplary embodiment shown in FIGS. 5-7, the retaining member 52 has a single leg 62. However, as noted above, the retaining member 52 may have more than one leg 62 attached to or extending from the base portion 60. Each leg 62 has a substantially straight main body 62a that extends from the base portion 60 at an angle "A" and an end portion 62b that is at an angle "B" relative to the main body 62a. As such, the leg 62 is cantilevered from the base portion 60 at the point where the base portion 60 connects to the leg 62. This cantilever permits flexibility of the leg 62 relative to the base portion 60, which is secured to the mounting bracket 54. The angle "A" may depend upon a number of factors, including, the length of the leg 62, and the angle between the base portion 60 and a central axis 66 of the cable stop 56, seen in FIG. 4. As a non-limiting example, the angle "A" can be about 145 degrees, which provides suitable flexibility of the retaining member 52 to allow insertion of a cable into the electrical box 20 while imparting sufficient resistance on the cable preventing rearward movement of the cable to prevent withdrawal of the cable from the electrical box 20. The angle "B" may depend upon a number of factors, including the angle "A" and the angle between the base portion 60 and the central axis 66 of the cable stop 56. As a non-limiting example, the angle "B" can be about 145 degrees. The end portion 62b of the leg 62 may include a cable gripping portion 62c, seen in FIG. 6, that is configured to substantially conform to an outer periphery of the sheathing of an electrical cable, and to engage the sheathing of the electrical cable, as will be described below. The end portion 62b of the leg 62 and the cable gripping portion 62c, if included, engages the cable sheathing 520, seen in FIG. 8, to impart sufficient resistance on the cable preventing rearward movement of the cable 510 to prevent withdrawal of the cable from the electrical box 20.

The retaining member 52 may be made of metal, e.g., steel or galvanized steel, or of non-metallic materials, such as plastic. An example of a suitable plastic material is injection molded thermoplastic. In addition, when using non-metallic cabling with a metallic retaining member 52, the end portion 62b of the leg 62 may include a protective coating to minimize damage to the non-metallic sheathing, such as a rubber or plastic coating. The retaining member 52 may be made as a single unitary member bent, stamped or molded to a desired size and shape, or the retaining member 52 may comprise a plurality of components joined together by, for example, welds or adhesives, to a size and shape sufficient to retain a cable within the electrical box 20.

Figure 8:
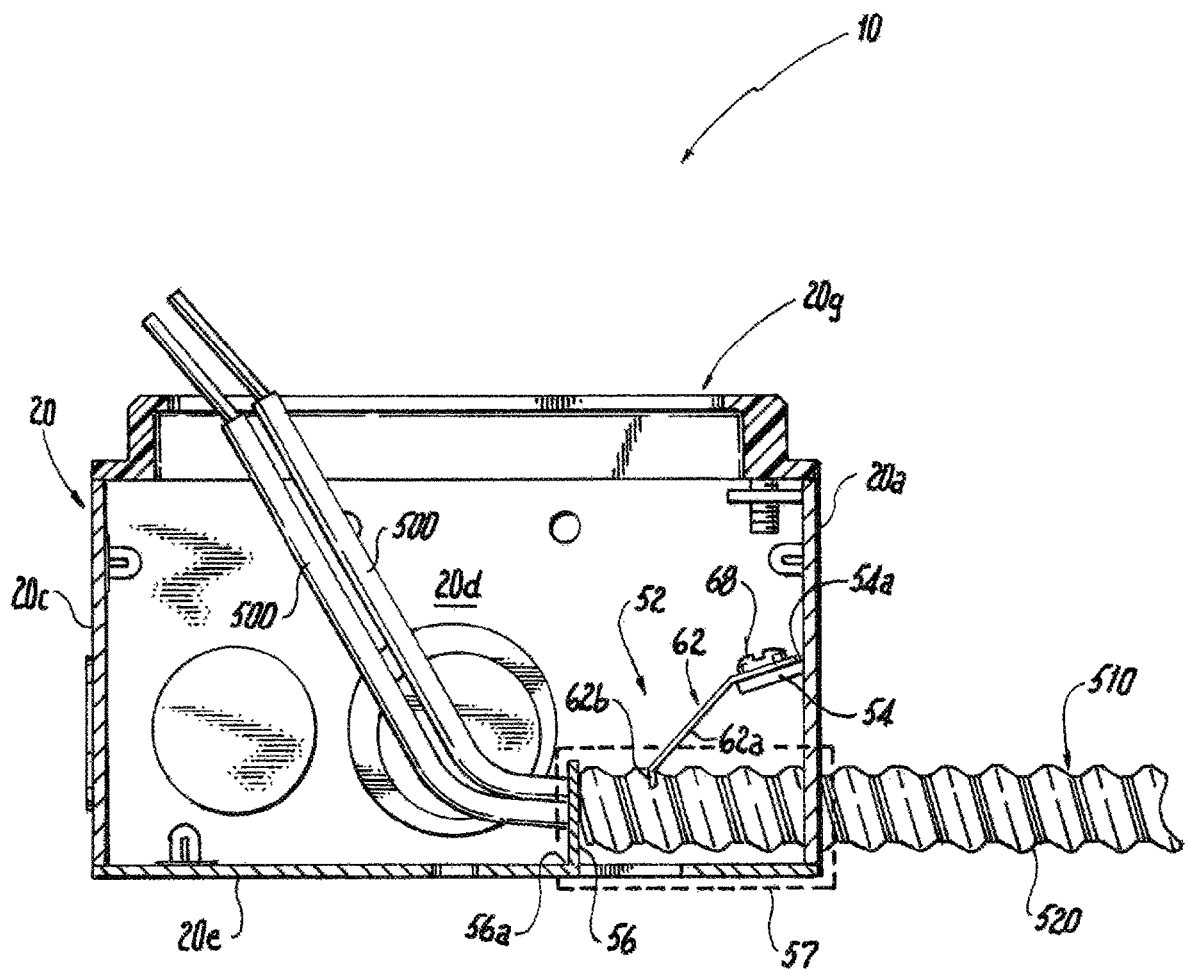
FIG. 8 is the cross-sectional view of the electrical box assembly of FIG. 4, illustrating a metallic sheath cable passing through a pry-out opening in a side wall of the electrical box and connected to the electrical box using the cable connector assembly.

Referring to FIG. 8, the end portion 62b of each leg 62 is aligned within the cable receiving zone 57 of the electrical box 20 so that the leg 62 can flex when a cable 510 is passed through a pry-out opening into the electrical box 20, and is biased toward a normal state when the cable 510 is fully inserted such that the end portion 62b of the leg 62 engages the cable sheathing 520 to impart sufficient resistance on the cable preventing rearward movement of the cable 510 so as to prevent withdrawal of the cable 510 from the electrical box 20. To remove the cable 510 from the electrical box 20, upward pressure can be applied to the leg 62 of the retaining member 52 so that the end portion 62b no longer engages the cable sheathing 520.

Figure 3:
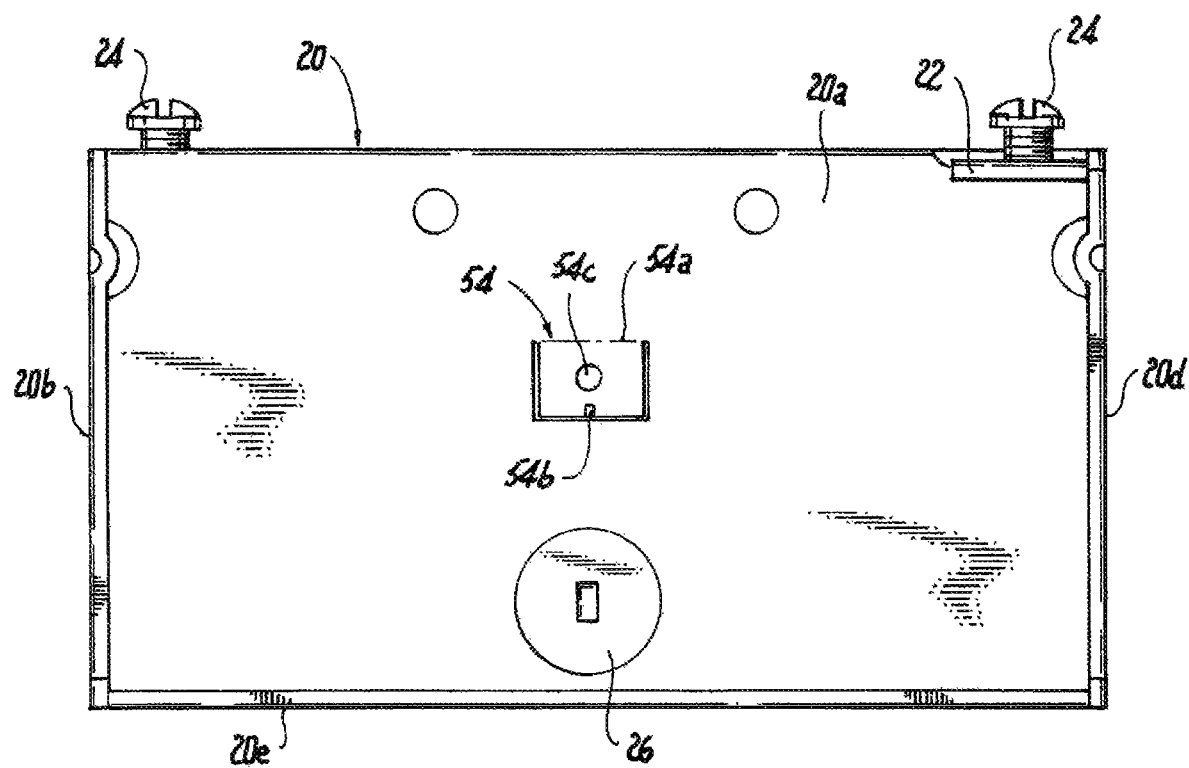
FIG. 3 is a side elevation view of the electrical box assembly of FIG. 1.

Referring to FIGS. 1-8, the cable retaining member 52 can be releasably secured to the mounting bracket 54 extending from one or more of the side walls 20a-20d of the electrical box 20. The mounting bracket 54 may be secured to a side wall of the electrical box 20, e.g., side wall 20a, at a predefined angle "C", seen in FIG. 4, or the mounting bracket 54 may be integrally or monolithically formed into a side wall, e.g., the side wall 20a, and includes a hinge 54a and a slot 54b, seen in FIG. 3, that permits the mounting bracket 54 to be manufactured and shipped so that the mounting bracket 54 is in-line with a side wall, e.g., side wall 20a, of the electrical box 20, as seen in FIG. 3. The hinge 54a permits the mounting bracket 54 to be pivoted to the desired angle "C" in the field by the electrician using the slot 54b. The mounting aperture 54c in the mounting bracket 54 may be a threaded aperture configured to receive a mounting screw 68 used to secure the retainer member 52 to the mounting bracket 54, as seen in FIG. 4.

Referring to FIGS. 1, 4 and 8, the cable stop 56 extends from the bottom wall 20e of the electrical box 20 and includes a wire opening 58 that permits electrical wires, e.g., wires 500, from an electrical cable 510 passing through a pry-out opening in a side wall, e.g., side wall 20a, of the electrical box 20 to pass through the cable receiving zone 57 and into the electrical box 120 for connection to other wires or an electrical device or fixture. It is noted that the electrical cable 510 may include armored cabling and non-metallic cabling. Non-limiting examples of armored electrical cables 510 include BX type cables, MC-PCS type cables, and Greenfield type flexible armored cabling. Non-limiting examples of non-metallic cabling includes Romex cabling and underground feeder (UF) cabling.

The cable stop 56 may be secured to the bottom wall of the electrical box 20 at a predefined angle "D," seen in FIG. 4, such as a 90 degree angle, or the cable stop 56 may be integrally or monolithically formed into the bottom wall 20e and includes a hinge 56a that permits the cable stop 56 to be manufactured and shipped so that the cable stop 56 is in-line with the bottom wall 20e of the electrical box 20. The hinge 56a permits the cable stop 56 to be pivoted to the desired angle "D" in the field by the electrician using a slot similar to the slot 54b. In this exemplary embodiment of the cable stop 56, the wire opening 58 is aligned with the center line 66, seen in FIG. 4, and includes a rounded edge 58a, seen in FIGS. 1 and 8, around the periphery of the opening 58 to minimize potential damage to insulation surrounding wires 500 passing through the wire opening 58. Alternatively, the wire opening 58 can include, for example, a rubber or plastic grommet to minimize potential damage to insulation surrounding wires 500 passing through the wire opening 58. The size of the wire opening 58 may vary depending upon a number of factors, including the number of wires 500 within the electrical cable 510 and the diameter of the sheathing 520 of the cable. The cable stop 56 acts as a stop to prevent the cable sheathing 520, e.g., armored electrical cable sheathing or non-metallic sheathing, from passing further into the electrical box 20. The wire opening 58 is aligned with the box pry-outs 26 when the cable stop 56 is set to its desired angle "D." As a result, a cable 510 can be passed through the pry-out opening into the cable receiving zone 57 of the electrical box 20, and the wires 500 within the cable 510 can pass through the wire opening 58 further into the electrical box, as seen in FIG. 8.

Figure 9:
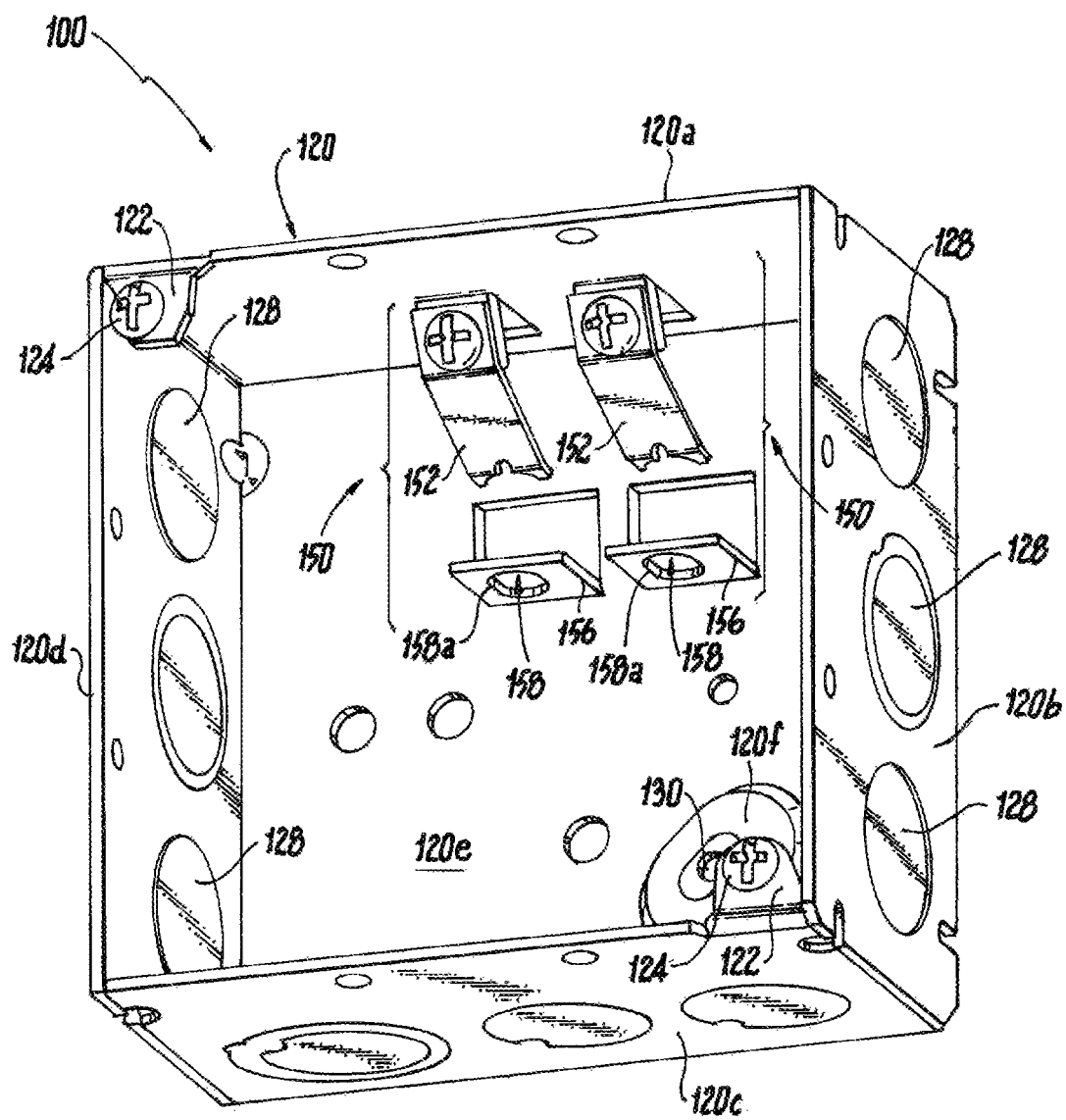
FIG. 9 is a perspective view of another exemplary embodiment of an electrical box assembly according to the present disclosure, illustrating an electrical box and two cable connector assemblies positioned within the electrical box.

Turning to FIGS. 9-16, another exemplary embodiment of an electrical box assembly according to the present disclosure is shown. In this exemplary embodiment, the electrical box assembly 100 includes an electrical box 120 and one or more cable connector assemblies 150 (also referred to as a cable clamp) installed or positioned within the electrical box 120. In this exemplary embodiment, the electrical box 120 has four sides 120a-120d and a bottom 120e. The electrical box 120 can be fabricated from metal, e.g., steel or galvanized steel, or from non-metallic materials. A non-limiting example of a suitable non-metallic material is a plastic material. An example of a suitable plastic material is injection molded thermoplastic. In the embodiment shown in FIG. 9-12, the electrical box 120 is a conventional 4×4 square box (or what is also known in the industry as a 4" square box or a 1900 box), however any suitable sized electrical box may be used for the present disclosure. As non-limiting examples, the size of the electrical box includes single gang and/or multi-gang boxes, such as a 3-gang box or raceways. Further, the depth of the electrical box 120 may vary. As non-limiting examples, the depth of the electrical box may be 1¼ inches, 1½ inches, 2⅛ inches or 3½ inches in depth. The electrical box 120 may also include one or more mounting tabs 122 with threaded or tapped mounting holes, where threaded screws 124 (e.g., 8/32 machine screws) can be inserted to secure a cover 120g or to secure an extension ring or plaster ring to the electrical box 120. Non-limiting examples of covers include blank covers, switch covers and receptacle covers. The electrical box 120 may include one or more cable entrance pry-outs 126, seen in FIG. 11, that when removed create an opening in the electrical box 120 to permit electrical cables to be inserted into the electrical box 120. The electrical box 120 may also include one or more knock-outs 128, seen in FIG. 9, used to secure known cable clamps or cable connectors to the box housing. The knock-outs 128 can come in many sizes. For example, the knock-outs 128 can be ½ inch, ¾ inch, 1 inch or greater in diameter. To connect the electrical box 120 to electrical ground, a ground screw aperture 130 may be included in the electrical box 120. In conventional 4×4 electrical boxes, the ground screw aperture is typically on a raised surface 120f of the bottom 120e of the electrical box 120, as seen in FIG. 9. The ground screw aperture 130 is typically a threaded or tapped hole for insertion of a ground screw, e.g., an 8/32 machine screw, that is typically color coded as green.

Continuing to refer to FIGS. 9-16, another exemplary embodiment of a cable connector assembly 150 according to the present disclosure includes a cable retaining member 152, a mounting bracket 154 and a cable stop 156. For ease of description the cable retaining member may be referred to as the "retaining member" in the singular and as the "retaining members" in the plural. The retaining member 152 may be provided in various shapes and sizes sufficient to flex while an electrical cable passes into the electrical box imparting little resistance to the forward advancement of the cable while imparting sufficient resistance on the cable preventing rearward movement of the cable to prevent withdrawal of the cable from the electrical box. The area around the cable connector assembly 150 illustrated by the dashed lines is referred to herein as a cable receiving zone 157, seen in FIG. 10. The cable receiving zone 157 of the electrical box 120 is the area from a side wall of the electrical box in proximity to the cable connector assembly 150 where an electrical cable can be positioned for clamping to the electrical box 120.

Figure 12:
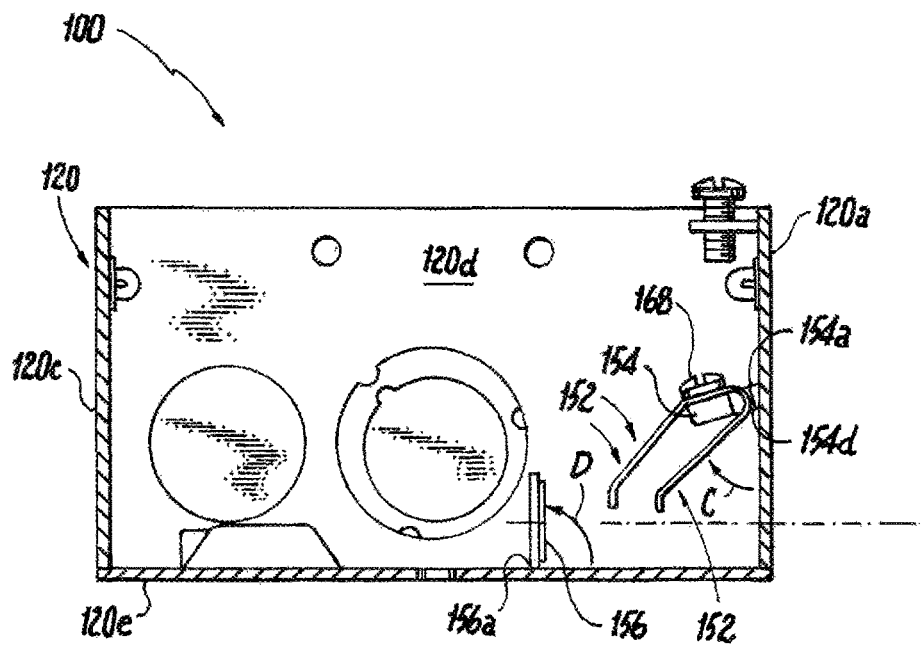
FIG. 12 is a cross-sectional view of the electrical box assembly of FIG. 10 taken from line 12-12 and illustrating another exemplary embodiment of a cable connector assembly positioned within the electrical box.
Figure 13:
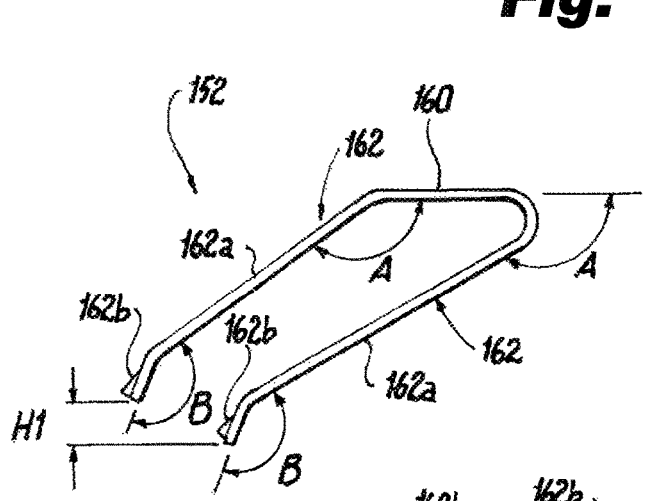
FIG. 13 is a side elevation view of another exemplary embodiment of a retaining member of the cable connector assembly of FIG. 12.
Figure 14:
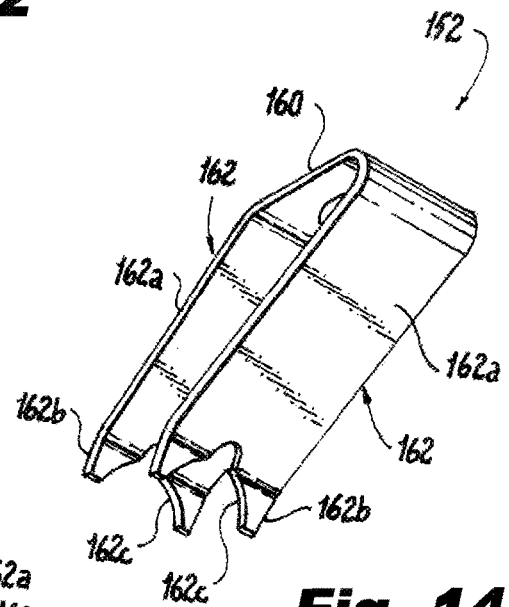
FIG. 14 is a perspective view from the bottom of the retaining member of FIG. 13.
Figure 15:
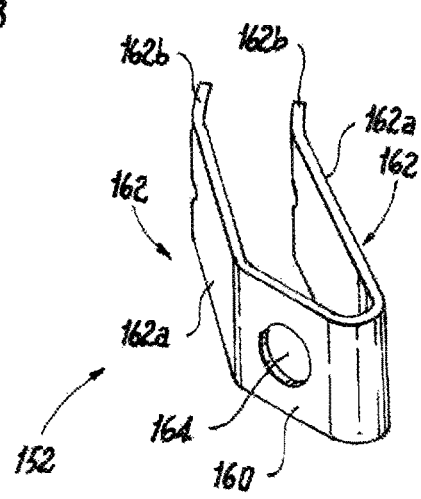
FIG. 15 is a perspective view from a top surface of the retaining member of FIG. 13.
Figure 12A:
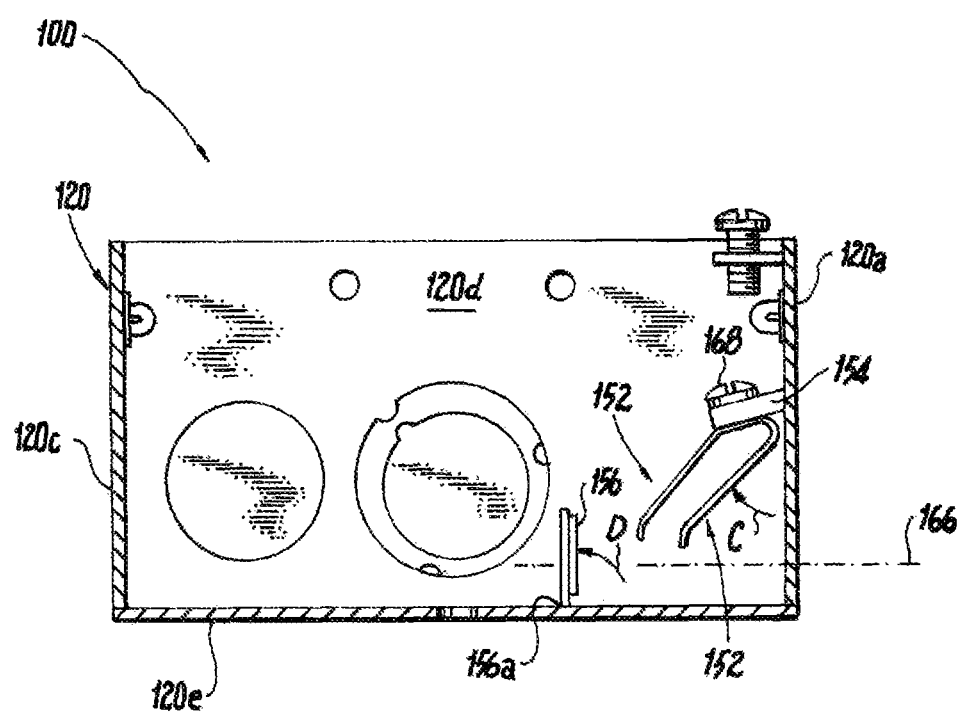
FIG. 12A is a cross-sectional view of the electrical box assembly of FIG. 10 similar to FIG. 12, illustrating another exemplary embodiment of a cable connector assembly positioned within the electrical box.

Referring to FIGS. 13-15, an exemplary embodiment of the retaining member 152 includes a base portion 160 and two or more legs 162 extending from the base portion 160. The base portion 160 is generally straight and includes an aperture 164 used in securing the retaining member 152 to the mounting bracket 154. The base portion 160 may be secured to a top surface of the mounting bracket 154 as seen in FIG. 12 or to a bottom surface of the mounting bracket 154 as seen in FIG. 12A. In an embodiment where the cable retaining member 152 is integrally formed into the mounting bracket 154, the base portion 160 of the cable retaining member 152 would be integral with or monolithically formed into the mounting bracket 154 and the two or more legs 162 would extend from the mounting bracket 154.

In the exemplary embodiment shown in FIGS. 9-16, the retaining member 152 has two legs 162. However, the retaining member 152 may have one leg or more than two legs attached to or extending from the base portion 160. The legs 162 are secured to the base portion 160 so that the long surfaces of each leg 162 are in parallel, and capable of flexing while an electrical cable passes through a pry-out opening described above into the electrical box 120, imparting little resistance to the forward advancement or movement of the cable 510 into the electrical box.

Each leg 162 has a substantially straight main body 162a that extends from the base portion 160 at an angle "A" and an end portion 162b that is at an angle "B" relative to the main body 162a. As such, the leg 162 is cantilevered from the base portion 160 at the point where the base portion 160 connects to the leg 162. This cantilever permits flexibility of the leg 162 relative to the base portion 160, which is secured to the mounting bracket 154. The angle "A" may depend upon a number of factors, including the length of the leg 162, and the angle between the base portion 160 and a central axis 166 of the cable stop 156, seen in FIG. 12. As a non-limiting example, the angle "A" can be about 145 degrees, which provides suitable flexibility of the retaining member 152 to allow insertion of a cable into the electrical box 120 while imparting sufficient resistance on the cable preventing rearward movement of the cable to prevent withdrawal of the cable from the electrical box 120. The angle "B" may depend upon a number of factors, including the angle "A" and the angle between the base portion 160 and a central axis 166 of the cable stop 156. As a non-limiting example, the angle "B" can be about 145 degrees. The end portion 162b of the leg 162 may include a cable gripping portion 162c, seen in FIG. 14, that is configured to substantially conform to an outer periphery of the sheathing of an electrical cable, and to engage the sheathing of the electrical cable. The end portion 162b of the leg 162 and the cable gripping portion 162c, if included, engages the cable sheathing 520, seen in FIG. 16, to impart sufficient resistance on the cable preventing rearward movement of the cable 510 to prevent withdrawal of the cable from the electrical box.

The retaining member 152 may be made of metal, e.g., steel or galvanized steel, or from non-metallic materials, such as plastic. An example of a suitable plastic material is injection molded thermoplastic. In addition, when using non-metallic cabling with a metallic retaining member 152, the end portions 162b of the legs 162 may include a protective coating to minimize damage to the non-metallic sheathing, such as a rubber or plastic coating. The retaining member 152 may be made as a single unitary member bent, stamped or molded to a desired size and shape, or the retaining member 152 may comprise a plurality of components joined together by, for example, welds or adhesives, to a size and shape sufficient to retain a cable within the electrical box 120.

Referring again to FIG. 16, the end portion 162*b* of each leg 162 is aligned within the cable receiving zone 157 of the electrical box 120 so that it can flex when a cable 510 is passed through a pry-out opening into the cable receiving zone 157 of the electrical box 120, and is biased toward a normal state when the cable 510 is fully inserted such that the end portion 162*b* of leg 162 engages the cable sheathing 520 to impart sufficient resistance on the cable preventing rearward movement of the cable 510 so as to prevent withdrawal of the cable 510 from the electrical box 120. To accommodate cables having different outside diameters, the legs 162 can be configured so that the end portions 162*b* can extend into the cable receiving zone 157 and end at different height positions within the cable receiving zone, such that there is a height difference "H1" between the end portions 162*b*, as shown in FIG. 12. To remove the cable 510 from the electrical box 120, upward pressure can be applied to the legs 162 so that the end portions 162*b* no longer engage the cable sheathing 520.

The cable retaining member 152 can be releasably secured to the mounting bracket 154 extending from one or more of the side walls 120*a*-120*d* of the electrical box 120. The mounting bracket 154 may be secured to a side wall of the electrical box 120, e.g., side wall 120*a*, at a predefined angle "C", seen in FIG. 12, or the mounting bracket 154 may be integrally or monolithically formed into the side wall 120*a*. In embodiments where the mounting bracket 154 may be integrally or monolithically formed into the side wall 120*a*, the mounting bracket 154 includes a hinge 154*a* and a slot 154*b*, seen in FIG. 11, that permits the mounting bracket 154 to be manufactured and shipped so that it is in-line with a side wall, e.g., side wall 120*a*, of the electrical box 120, as seen in FIG. 12. The hinge 154*a* permits the mounting bracket 154 to be pivoted to the desired angle "C" in the field by the electrician using the slot 154*b*. The mounting aperture 154*c* in the mounting bracket 154 is typically a threaded aperture configured to receive a mounting screw 168 used to secure the retainer member 152 to the mounting bracket 154 as seen in FIG. 12. The mounting bracket 154 may also include an opening 154*d*, seen in FIG. 11, through which one of the legs 162 can pass when securing the retaining member 152 to the mounting bracket 154 similar to that shown in FIGS. 19A and 19B.

Figure 16:
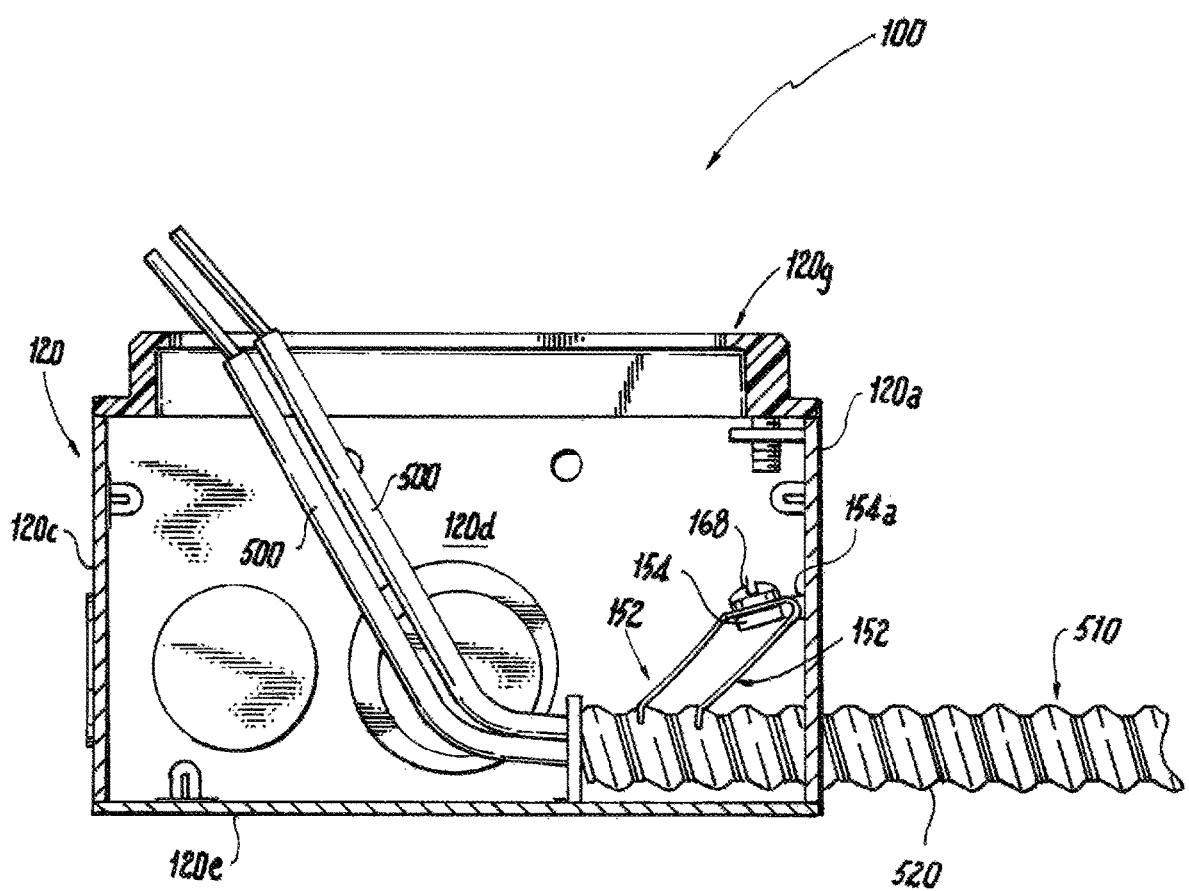
FIG. 16 is the cross-sectional view of the electrical box assembly of FIG. 12, illustrating a metallic sheath cable passing through a pry-out opening in a side wall of the electrical box and connected to the electrical box using the cable connector assembly.

Referring to FIGS. 9, 12 and 16, the cable stop 156 extends from the bottom wall 120*e* of the electrical box 120 and includes a wire opening 158 that permits electrical wires, e.g., wires 500, from an electrical cable 510 passing through a pry-out opening in a side wall, e.g., side wall 120*a*, of the electrical box 120 to pass through the cable receiving zone 157 and into the electrical box 120 for connection to other wires or an electrical device or fixture. The cable stop 156 may be secured to the bottom wall 102*e* of the electrical box 120 at a predefined angle "D", such as a 90 degree angle, or the cable stop 156 may be integrally or monolithically formed into the bottom wall 120*e* and includes a hinge 156*a*, seen in FIG. 12, that permits the cable stop 156 to be manufactured and shipped so that the cable stop 156 is in-line with the bottom wall 120*e* of the electrical box 120. The hinge 156*a* permits the cable stop 156 to be pivoted to the desired angle "D" in the field by the electrician using the slot 154*b*. In this exemplary embodiment, the wire opening 158 of the cable stop 156 is aligned with the center line 166, seen in FIG. 12, and includes a rounded edge 158*a*, seen in FIG. 9, around the periphery of the opening 158 to minimize potential damage to insulation surrounding wires 500 passing through the wire opening 158 as seen in FIG. 16. Alternatively, the wire opening 158 can include, for example, a rubber or plastic grommet to minimize potential damage to insulation surrounding wires 500 passing through the wire opening 158. The size of the wire opening 158 may vary depending upon a number of factors, including the number of wires 500 within the electrical cable 510 and the diameter of the sheathing 520 of the cable. The cable stop 156 acts as a stop to prevent the cable sheathing 520, e.g., armored electrical cable sheathing or non-metallic sheathing, from passing further into the electrical box 120. The wire opening 158 is aligned with box pry-outs 126, seen in FIG. 11, when the cable stop 156 is set to its desired angle "D." As a result, a cable 510 can be passed through the pry-out opening into the cable receiving zone 157 of the electrical box 120, and the wires 500 within the cable 510 can pass through the wire opening 158 further into the electrical box, as seen in FIG. 16.

Figure 10:
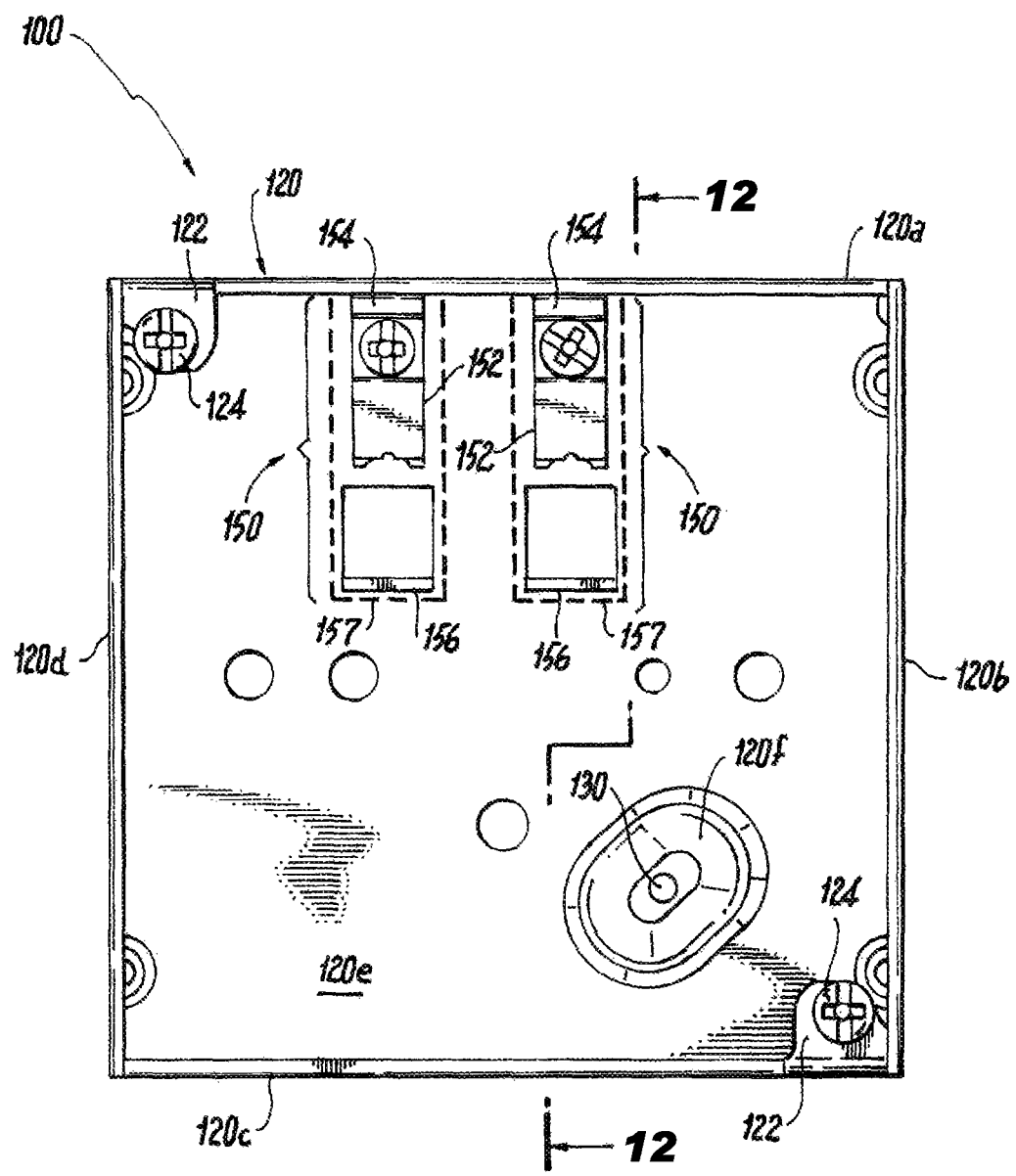
FIG. 10 is a top plan view of the electrical box assembly of FIG. 9.
Figure 10A:
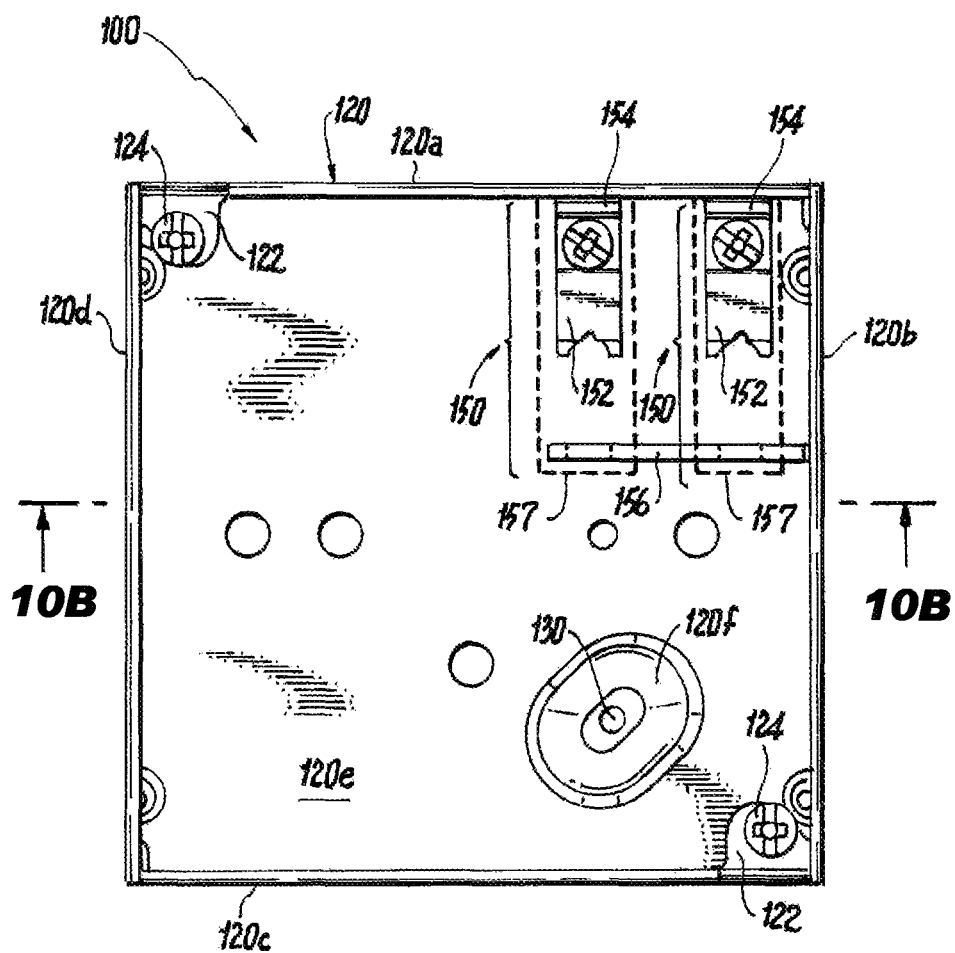
FIG. 10A is a top plan view of the electrical box assembly of FIG. 9, illustrating another exemplary embodiment of the cable connector assemblies.
Figure 10B:
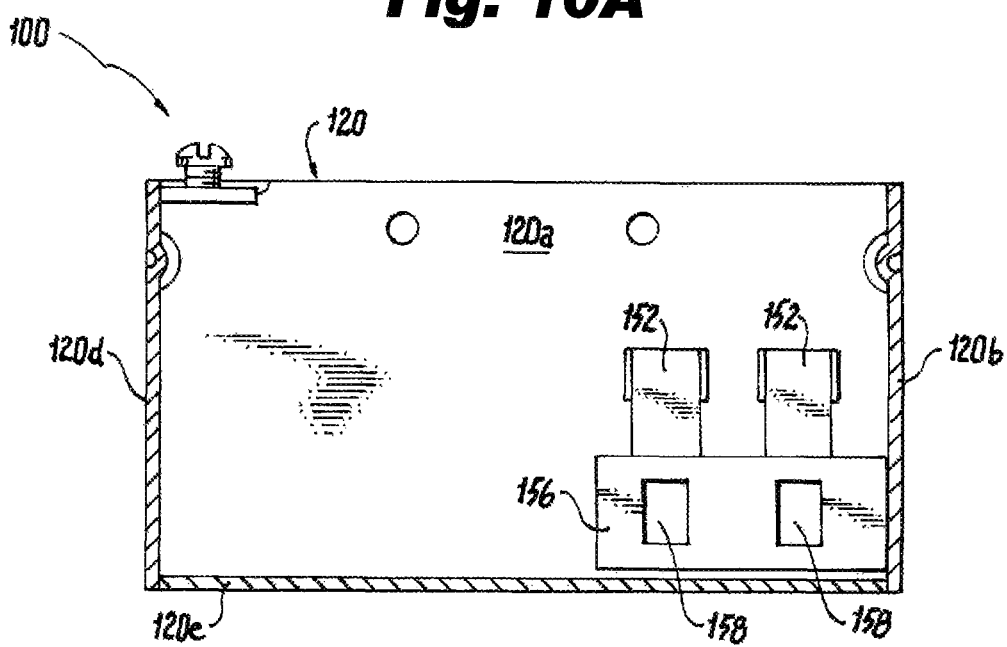
FIG. 10B is a cross-sectional view of the electrical box assembly of FIG. 10A taken from line 10B-10B.
Figure 11:
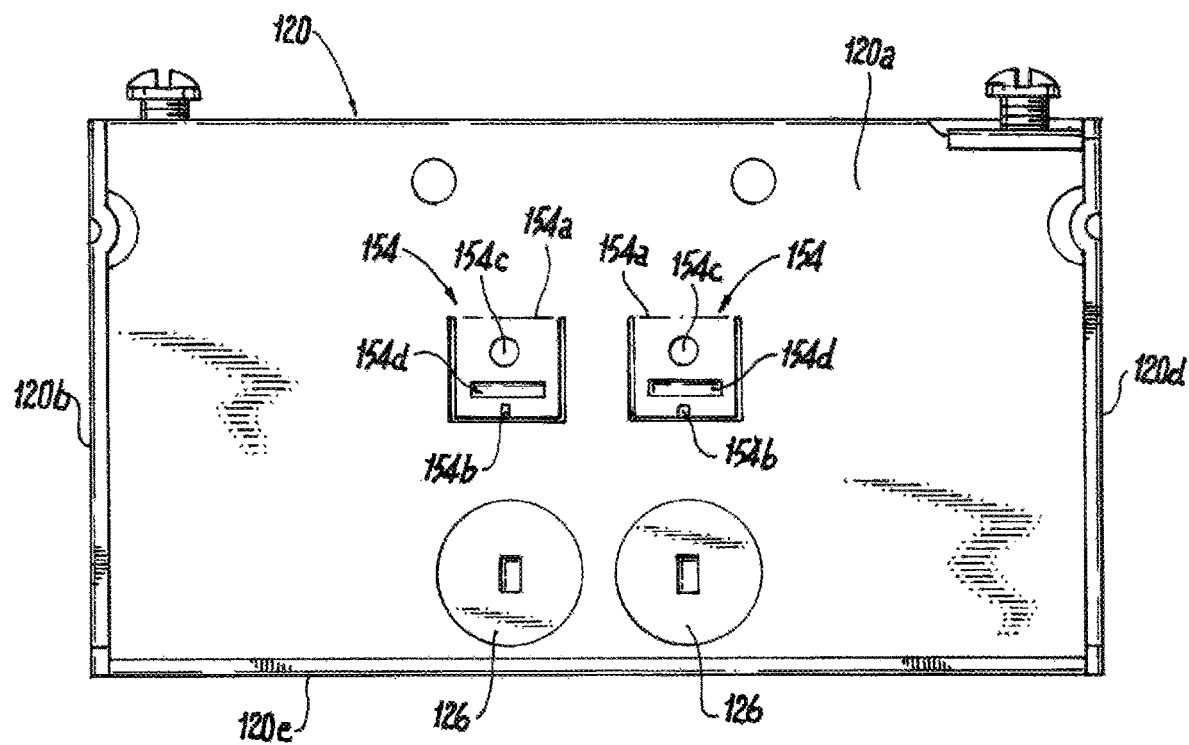
FIG. 11 is a side elevation view of the electrical box assembly of FIG. 9.

Referring to FIGS. 10A and 10B, another exemplary embodiment of a cable connector assembly 150 according to the present disclosure includes a cable retaining member 152, a mounting bracket 154 and a cable stop 156 which is similar to the embodiments described above. The cable stop 156 may be configured for a single cable, as shown in FIG. 10, or the cable stop 156 may be configured for multiple cables, as shown in FIGS. 10A and 10B. In this exemplary embodiment, the cable stop 156 extends from a side wall, e.g., side wall 120*b*, of the electrical box 120 and includes a plurality of wire openings 158 that permit electrical wires, e.g., wires 500, from an electrical cable 510 passing through pry-out openings in a side wall, e.g., side wall 120*a*, of the electrical box 120 to pass through the respective cable receiving zone 157 and into the electrical box 120 for connection to other wires or an electrical device or fixture.

Figure 17:
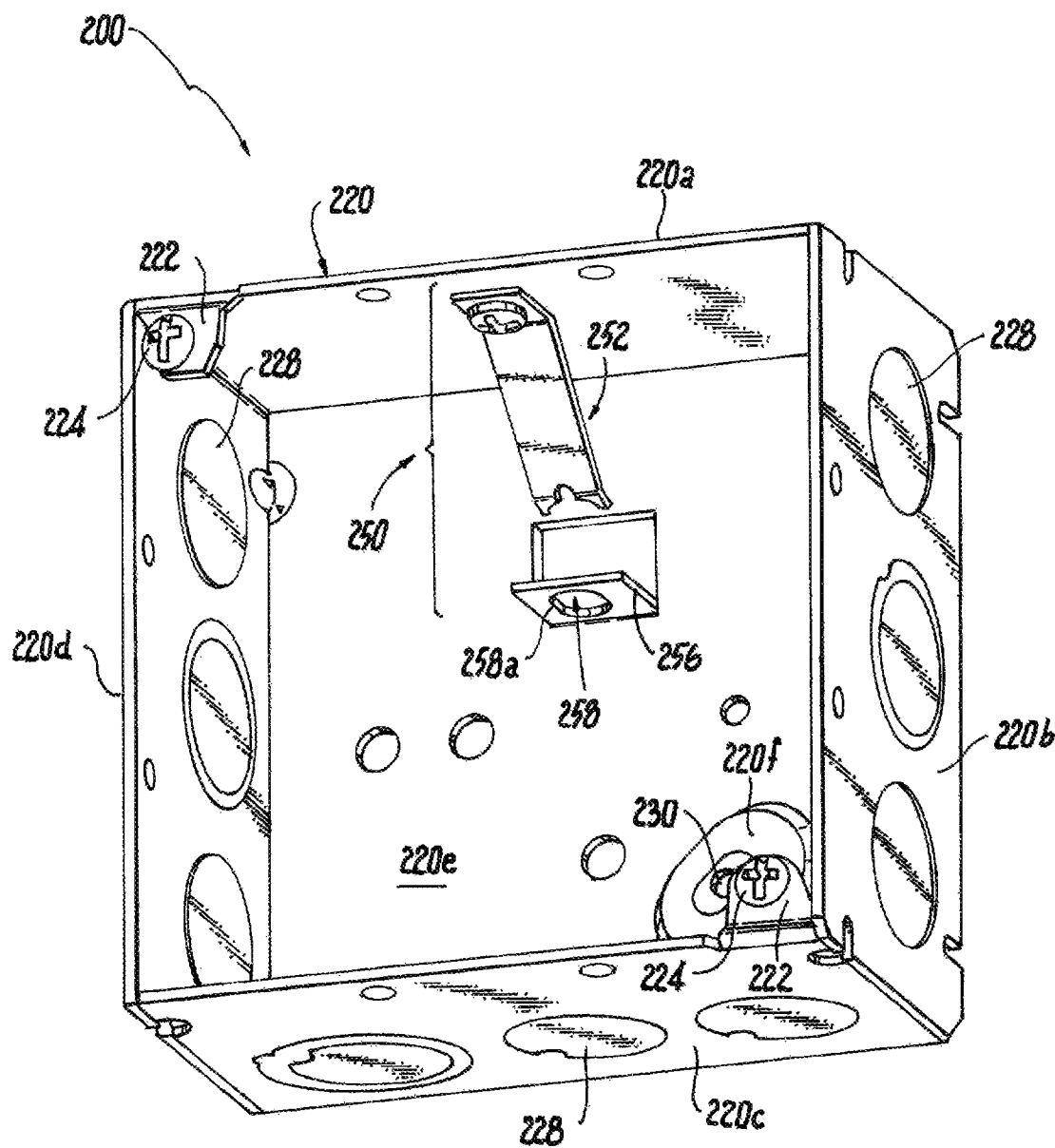
FIG. 17 is a perspective view of another exemplary embodiment of an electrical box assembly according to the present disclosure, illustrating an electrical box and another exemplary embodiment of a cable connector assembly positioned within the electrical box.
Figure 18:
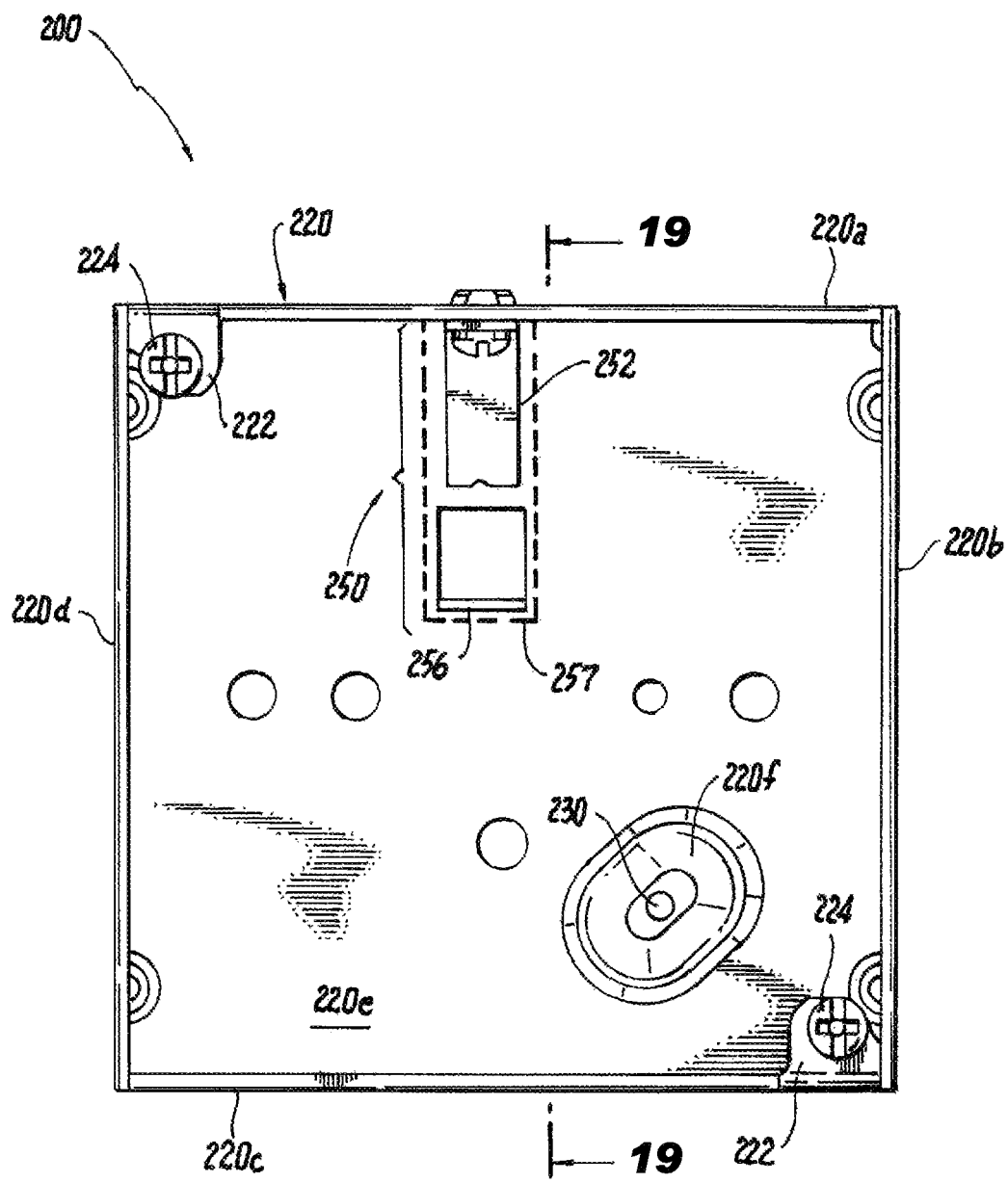
FIG. 18 is a top plan view of the electrical box assembly of FIG. 17.

Referring now to FIGS. 17-23, another exemplary embodiment of an electrical box assembly according to the present disclosure is shown. In this exemplary embodiment, the electrical box assembly 200 includes an electrical box 220 and one or more cable connector assemblies 250 (also referred to as a cable clamp) installed or positioned within the electrical box 220. In this exemplary embodiment, the electrical box 220 has four sides 220*a*-220*d* and a bottom 220*e*. The electrical box 220 can be fabricated from metal, e.g., steel or galvanized steel, or from non-metallic materials. A non-limiting example of a suitable non-metallic material is a plastic material. An example of a suitable plastic material is injection molded thermoplastic. In the embodiment shown in FIG. 17-19, the electrical box 220 is a conventional 4×4 square box (or what is also known in the industry as a 4" square box or a 1900 box), however any suitable sized electrical box may be used for the present disclosure. As non-limiting examples, the size of the electrical box includes single gang and/or multi-gang boxes, such as a 3-gang box or raceways. Further, the depth of the electrical box 220 may vary. As non-limiting examples, the depth of the electrical box may be 1¼ inches, 1½ inches, 2⅛ inches or 3½ inches in depth. The electrical box 220 may also include one or more mounting tabs 222 with threaded or tapped mounting holes, where threaded screws 224 (e.g., 8/32 machine screws) can be inserted to secure a cover 220*g* or to secure an extension ring or plaster ring to the electrical box 220. Non-limiting examples of covers include blank covers, switch covers and receptacle covers. The electrical box 220 may include one or more cable entrance pry-outs, similar to pry-outs 26 or 126 described above, that when removed create an opening in the electrical box 220 to permit electrical cables to be inserted into the electrical box 220. The electrical box 220 may also include one or more knock-outs 228, seen in FIG. 17, used to secure known cable clamps or cable connectors to the box housing. The knock-outs 228 can come in many sizes. For example, the knock-outs 228 can be ½ inch, ¾ inch, 1 inch or greater in diameter. To connect the electrical box 220 to electrical ground, a ground screw aperture 230 may be included in the electrical box 220. In conventional 4×4 electrical boxes, the ground screw aperture is typically on a raised surface 220f of the bottom 220e of the electrical box 220, as seen in FIGS. 17 and 18. The ground screw aperture 230 is typically a threaded or tapped hole for insertion of a ground screw, e.g., an 8/32 machine screw, that is typically color coded as green.

Continuing to refer to FIGS. 17-23, another exemplary embodiment of a cable connector assembly 250 according to the present disclosure includes a cable retaining member 252 and a cable stop 256. For ease of description the cable retaining member may be referred to as the "retaining member" in the singular and as the "retaining members" in the plural. The retaining member 252 may be provided in various shapes and sizes sufficient to flex while an electrical cable passes into the electrical box imparting little resistance to the forward advancement or movement of the cable while imparting sufficient resistance on the cable preventing rearward movement of the cable to prevent withdrawal of the cable from the electrical box. The area around the cable connector assembly 250 illustrated by the dashed lines is referred to herein as a cable receiving zone 257, seen in FIG. 18. The cable receiving zone 257 of the electrical box 220 is the area from a side wall of the electrical box in proximity to the cable connector assembly 250 where an electrical cable can be positioned for clamping to the electrical box 220.

Figure 19A:
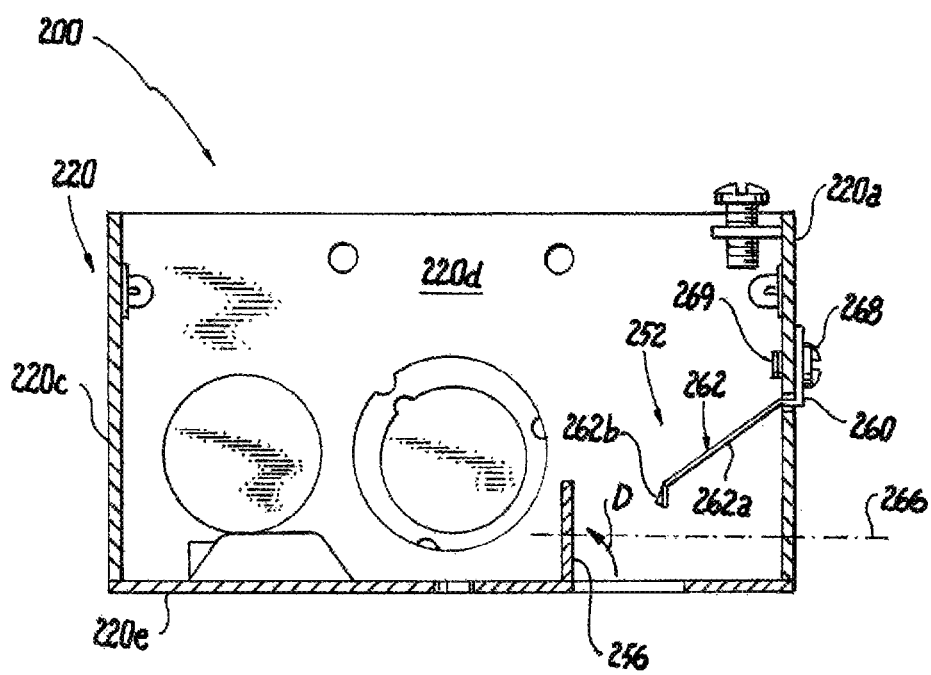
FIG. 19A is the cross-sectional view of the electrical box assembly of FIG. 19, illustrating another exemplary embodiment of a cable connector assembly according to the present disclosure.
Figure 19B:
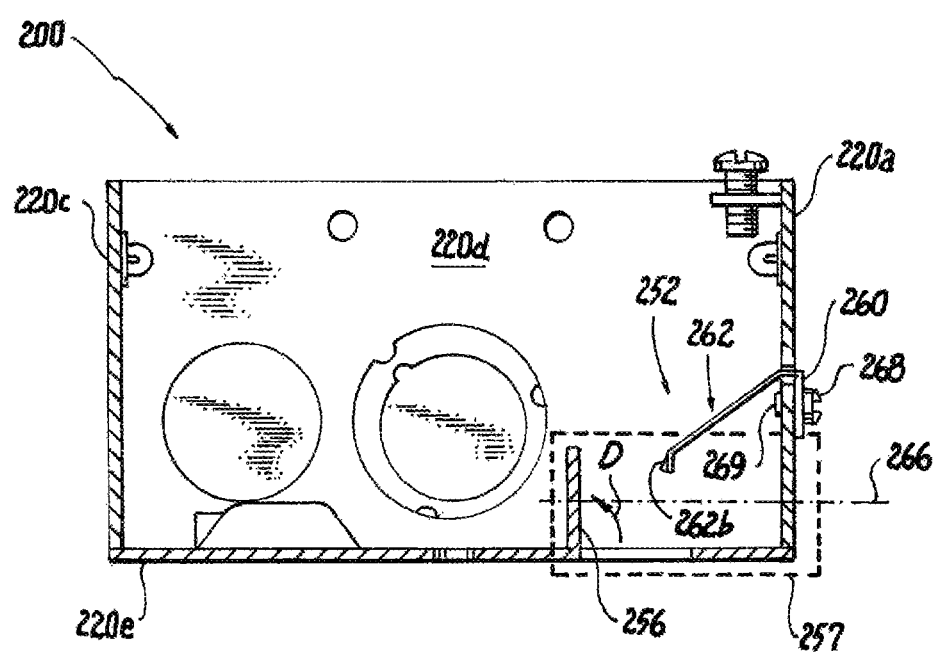
FIG. 19B is the cross-sectional view of the electrical box assembly of FIG. 19, illustrating another exemplary embodiment of a cable connector assembly according to the present disclosure.
Figure 20:
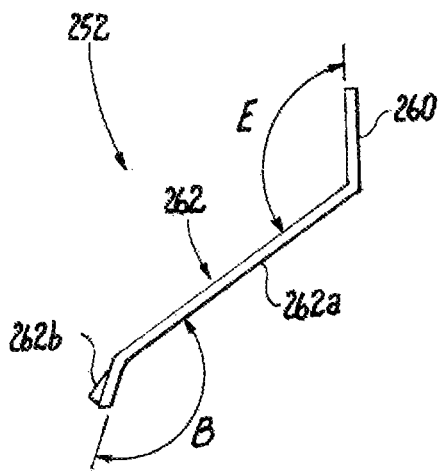
FIG. 20 is a side elevation view of another exemplary embodiment of a retaining member of the cable connector assembly of FIG. 19.
Figure 21:
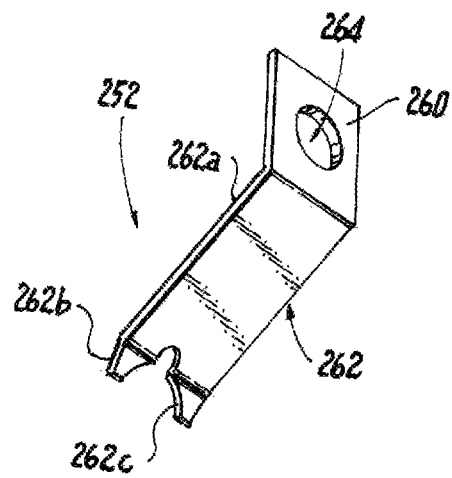
FIG. 21 is a perspective view from the bottom of the retaining member of FIG. 20.
Figure 22:
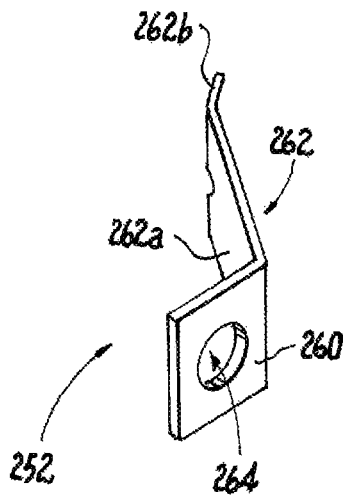
FIG. 22 is a perspective view from a top surface of the retaining member of FIG. 20.

Referring to FIGS. 20-22, an exemplary embodiment of the retaining member 252 includes a base portion 260 and one or more legs 262 extending from the base portion 260. The base portion 260 is generally straight and includes an aperture 264 used in securing the retaining member 252 to a side wall, e.g., side wall 220a, of the electrical box 220 using a fastener 268, e.g., a set screw or an adhesive, which may be inserted through aperture 264 in the base portion 260 and into an aperture in the side wall of the electrical box. In another exemplary embodiment, the leg 262 can be passed through an opening in a side wall, e.g., side wall 220a, that is similar to opening 154d, seen in FIG. 11 and described above, so that the opening 264 in the base portion 260 is aligned with an aperture 269 in the side wall of the electrical box 220. With the opening 264 in the base portion 260 aligned with the aperture 269 in the side wall of the electrical box 220, the base portion 260 can be secured to the side wall, e.g., 220a, of the electrical box 220 on the outside of the electrical box using fastener 268, as seen in FIGS. 19A and 19B. It is noted that in FIG. 19B, the cable retaining member 252 is configured and dimensioned similar to the cable retaining member 362 shown in FIGS. 27-29. In another exemplary embodiment, the cable retaining member 252 may be welded to or integrally or monolithically formed into a side wall 220a-220d of the electrical box 220, and the one or more legs 262 would extend from the side wall.

In this exemplary embodiment, each leg 262 has a substantially straight main body 262a that extends from the base portion 260 at an angle "E", and an end portion 262b that is at the angle "B" relative to the main body 262a. As such, the leg 262 is cantilevered from the base portion 260 at the point where the base portion 260 connects to the leg 262. This cantilever permits flexibility of the leg 262 relative to the base portion 260, which is secured to a side wall, e.g., side wall 220a, of the electrical box 220. The angle "E" may depend upon a number of factors, including, the length of the legs 262 of each retaining member 252, and the desired angle between the base portion 260 and a central axis 266 of the cable stop 156, seen in FIG. 19. As a non-limiting example, the angle "E" can be about 45 degrees, which provides suitable flexibility of the retaining member 252 to allow insertion of a cable into the electrical box 220 while imparting sufficient resistance on the cable preventing rearward movement of the cable to prevent withdrawal of the cable from the electrical box 220. The angle "B" may depend upon a number of factors, including the angle "E" and the angle between the base portion 260 and the central axis 266 of the cable stop 256. As an example, the angle "B" can be about 145 degrees. The end portion 262b of the leg 262 may include a cable gripping portion 262c, seen in FIG. 21, that is configured to substantially conform to an outer periphery of the sheathing of an electrical cable, and to engage the sheathing of the electrical cable. The end portion 262b of the leg 262 engages the cable sheathing 520, seen in FIG. 23, to impart sufficient resistance on the cable preventing rearward movement of the cable 510 to prevent withdrawal of the cable from the electrical box.

In the exemplary embodiment shown in FIGS. 17-23, the retaining member 252 has a single leg 262 extending from or attached to the base portion 260. However, as noted above, the retaining member 252 may have more than on leg 262 extending from or attached to the base portion 260. In instances where more than one leg 262 extends from or are attached to the base portion 260, the legs 262 would be secured to the base portion 260 so that the long surfaces of each leg 262 are in parallel, and capable of flexing while an electrical cable passes through a pry-out opening described above into the cable receiving zone 257 of the electrical box 220, imparting little resistance to the forward advancement or movement of the cable 510 into the electrical box.

The retaining member 252 may be made of metal, e.g., steel or galvanized steel, or from non-metallic materials, such as plastic. An example of a suitable plastic material is injection molded thermoplastic. In addition, when using non-metallic cabling with a metallic retaining member 252, the end portions 262b of the legs 262 may include a protective coating to minimize damage to the non-metallic sheathing, such as a rubber or plastic coating. The retaining member 252 may be made as a single unitary member bent, stamped or molded to a desired size and shape, or the retaining member 252 may comprise a plurality of components joined together by, for example, welds or adhesives, to a size and shape sufficient to retain a cable within the electrical box 220.

Figure 23:
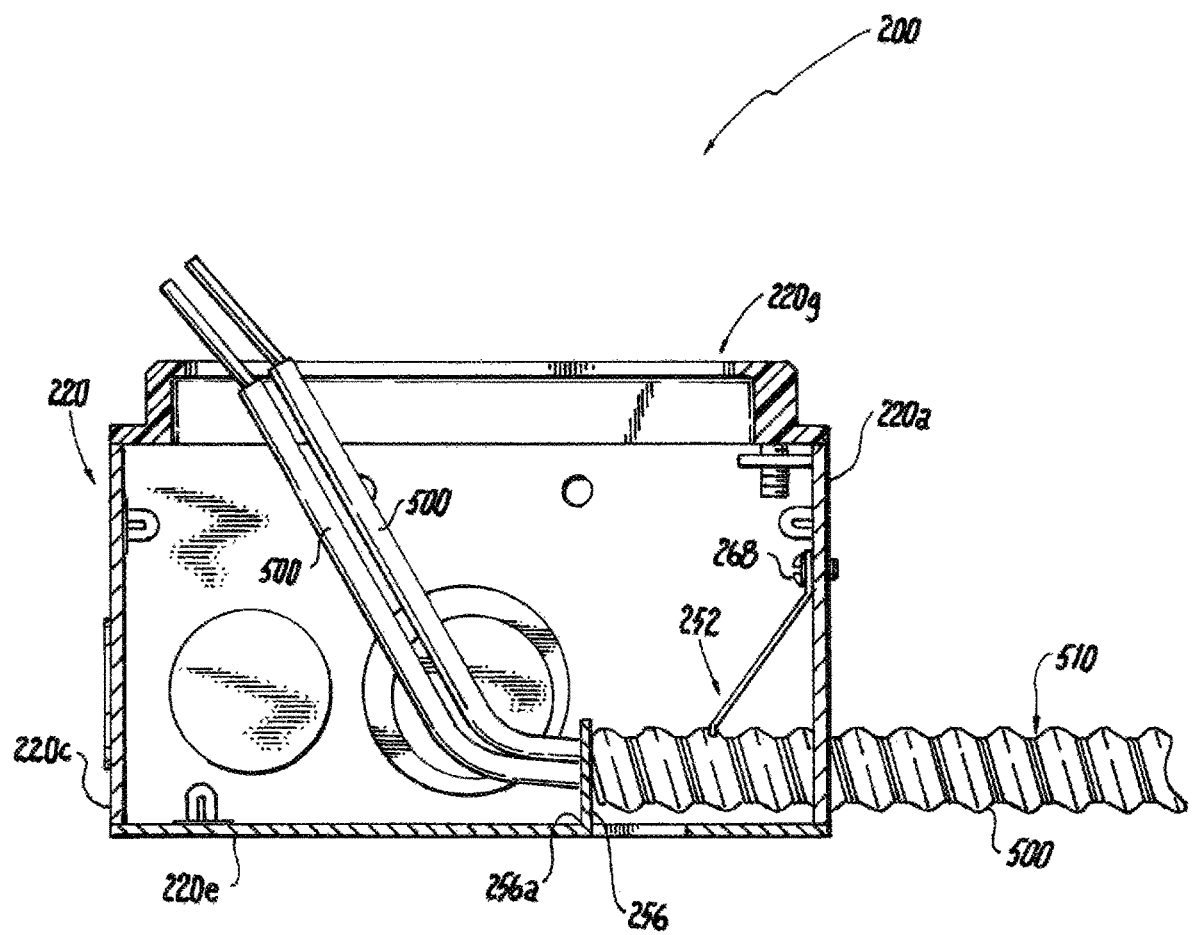
FIG. 23 is the cross-sectional view of the electrical box assembly of FIG. 19, illustrating a metallic sheath cable passing through a pry-out opening in a side wall of the electrical box and connected to the electrical box using the cable connector assembly.

Referring to FIG. 23, the end portion 262b of the leg 262 is aligned within the electrical box 220 so that it can flex when a cable 510 is passed through a pry-out opening into the cable receiving zone 257 of the electrical box 220 and is biased toward a normal state when the cable 510 is fully inserted such that the end portion 262b of leg 262 engages the cable sheathing 520 to impart sufficient resistance on the cable preventing rearward movement of the cable 510 so as to prevent withdrawal of the cable 510 from the electrical box 220. To accommodate cables having different outside diameters the cable retaining member 252 may include two legs 262. Each leg 262 can be configured so that the end portions 262b can extend into the cable receiving zone 257 and end at different height positions within the cable receiving zone, such that there is a height difference between the end portions 262b, similar to the embodiment shown in FIGS. 12 and 16. To remove the cable 510 from the electrical box 220, upward pressure can be applied to the legs 262 so that the end portions 262b no longer engage the cable sheathing 520.

Figure 19:
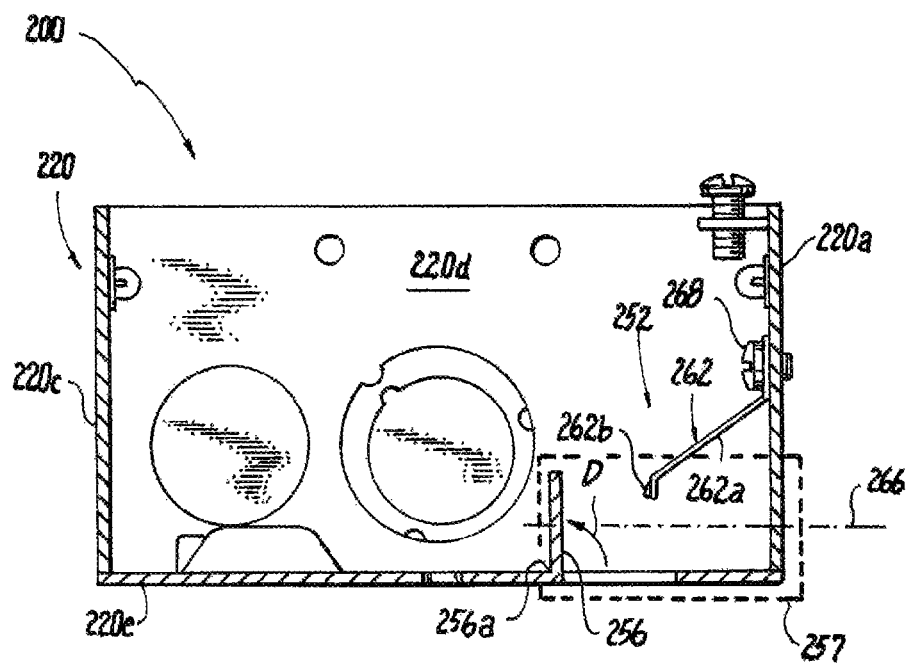
FIG. 19 is a cross-sectional view of the electrical box assembly of FIG. 18 taken from line 19-19 and illustrating another exemplary embodiment of a cable connector assembly according to the present disclosure.

Referring to FIGS. 17, 19 and 23, the cable stop 256 extends from the bottom wall 220e of the electrical box 220 and includes a wire opening 258 that permits electrical wires, e.g., wires 500, from an electrical cable 510 passing through a pry-out opening in a side wall, e.g., side wall 220a, of the electrical box 220 through the cable receiving zone 257 and further into the electrical box 220 for connection to other wires or an electrical device or fixture. The cable stop 256 may be secured to the bottom wall 220e of the electrical box 220 at the predefined angle "D", such as a 90 degree angle, or the cable stop 256 may be integrally or monolithically formed into the bottom wall 220e and includes a hinge 256a that permits the cable stop 256 to be manufactured and shipped so that the cable stop 256 is in-line with the bottom wall 220e of the electrical box 220. The hinge 256a permits the cable stop 256 to be pivoted to the desired angle "D" in the field by the electrician. In this exemplary embodiment of the cable stop 256, the wire opening 258 is aligned with the center line 266, seen in FIG. 19, and includes a rounded edge 258a, seen in FIG. 17, around the periphery of the opening 258 to minimize potential damage to insulation surrounding wires 500 passing through the wire opening 258 as seen in FIG. 23. Alternatively, the wire opening 258 can include, for example, a rubber or plastic grommet to minimize potential damage to insulation surrounding wires 500 passing through the wire opening 258. The size of the wire opening 258 may vary depending upon a number of factors, including the number of wires 500 within the electrical cable 510 and the diameter of the sheathing 520 of the cable. The cable stop 256 acts as a stop to prevent the cable sheathing 520, e.g., armored electrical cable sheathing or non-metallic sheathing, from passing further into the electrical box 220. The wire opening 258 is aligned with the box pry-outs, noted above and seen in FIG. 3, when the cable stop 256 is set to its desired angle "D." As a result, a cable 510 can be passed through the pry-out opening into the cable receiving zone 257 of the electrical box 220, and the wires 500 within the cable 510 can pass through the wire opening 258 further into the electrical box, as seen in FIG. 23.

Figure 24:
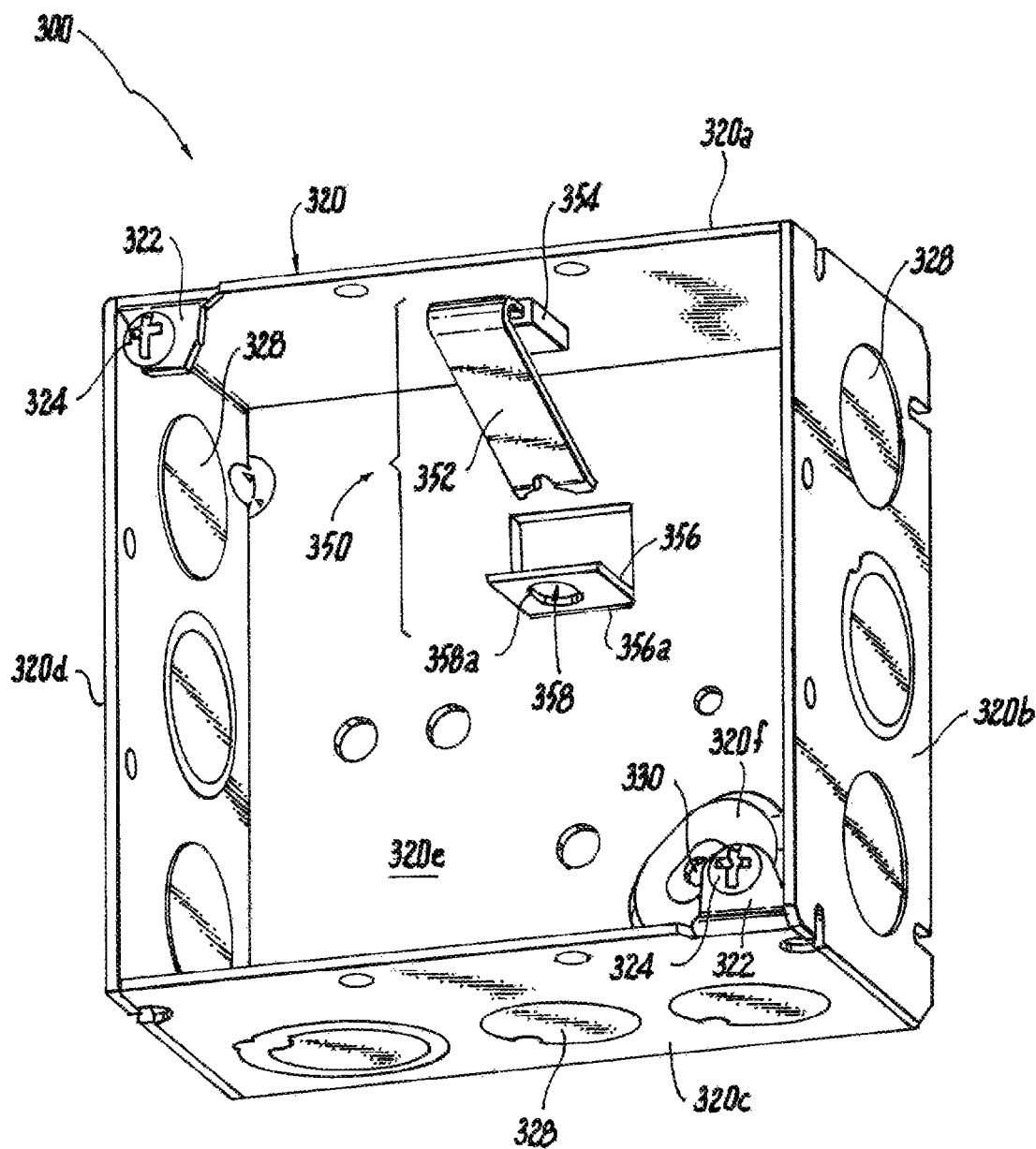
FIG. 24 is a perspective view of another exemplary embodiment of an electrical box assembly according to the present disclosure, illustrating an electrical box and another exemplary embodiment of a cable connector assembly positioned within the electrical box.
Figure 25:
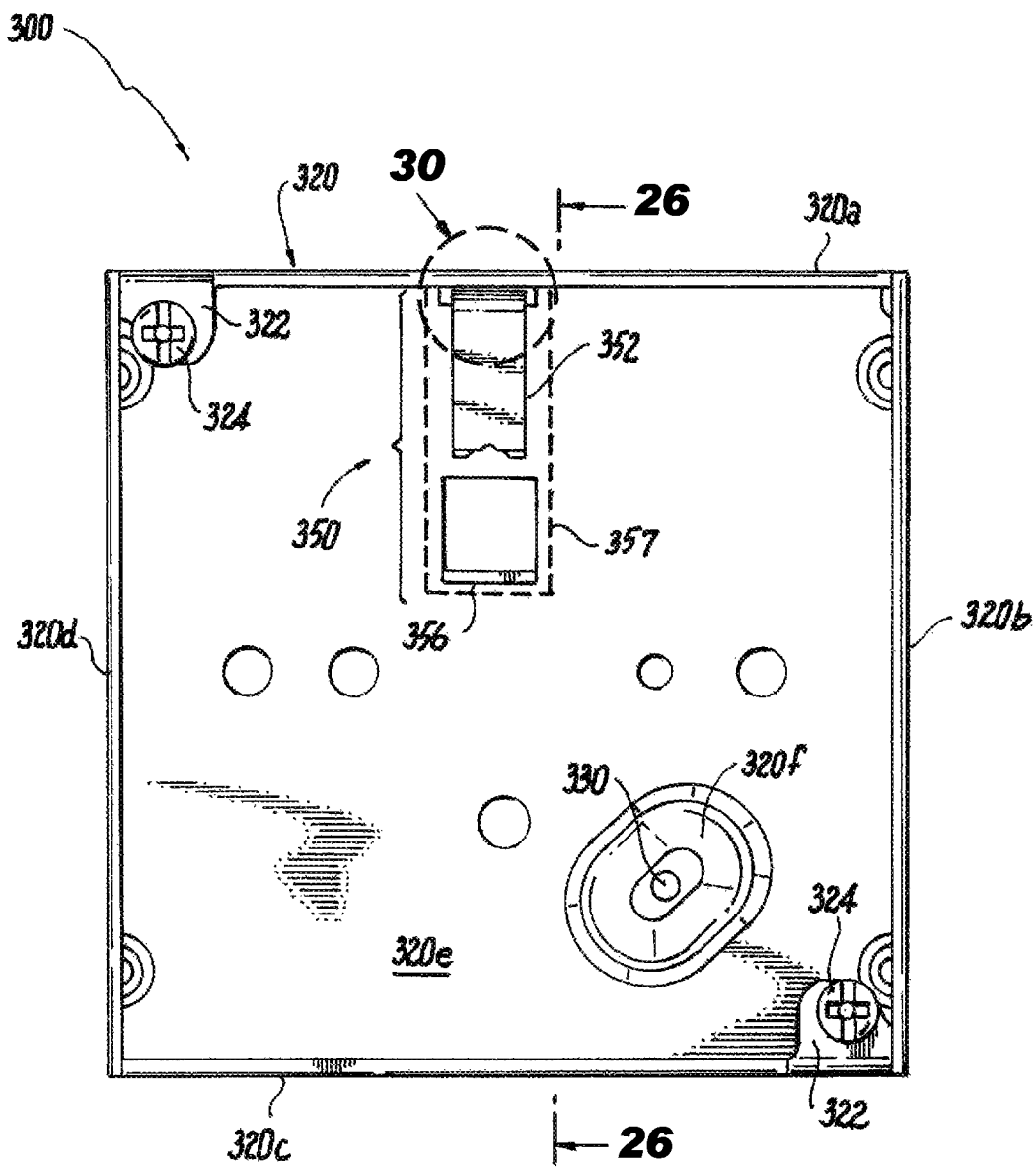
FIG. 25 is a top plan view of the electrical box assembly of FIG. 24.

Referring now to FIGS. 24-32, another exemplary embodiment of an electrical box assembly according to the present disclosure is shown. In this exemplary embodiment, the electrical box assembly 300 includes an electrical box 320 and one or more cable connector assemblies 350 (also referred to as a cable clamp) installed or positioned within the electrical box 320. In this exemplary embodiment, the electrical box 320 has four sides 320a-320d and a bottom 320e. The electrical box 320 can be fabricated from metal, e.g., steel or galvanized steel, or from non-metallic materials. A non-limiting example of a suitable non-metallic material is a plastic material. An example of a suitable plastic material is injection molded thermoplastic. In the embodiment shown in FIG. 24-29, the electrical box 320 is a conventional 4×4 square box (or what is also known in the industry as a 4" square box or a 1900 box), however any suitable sized electrical box may be used for the present disclosure. As non-limiting examples, the size of the electrical box includes single gang and/or multi-gang boxes, such as a 3-gang box or raceways. Further, the depth of the electrical box 320 may vary. As non-limiting examples, the depth of the electrical box may be 1¼ inches, 1½ inches, 2⅛ inches or 3½ inches in depth. The electrical box 320 may also include one or more mounting tabs 322 with threaded or tapped mounting holes, where threaded screws 324 (e.g., 8/32 machine screws) can be inserted to secure a cover 320g or to secure an extension ring or plaster ring to the electrical box 320. Non-limiting examples of the covers include blank covers, switch covers and receptacle covers. The electrical box 320 may include one or more cable entrance pry-outs, similar to pry-outs 26 or 126 described above, that when removed create an opening in the electrical box 320 to permit electrical cables to be inserted into the electrical box 320. The electrical box 320 may also include one or more knock-outs 328, seen in FIG. 24, used to secure known cable clamps or cable connectors to the box housing. The knock-outs 328 can come in many sizes. For example, the knock-outs 328 can be ½ inch, ¾ inch, 1 inch or greater in diameter. To connect the electrical box 320 to electrical ground, a ground screw aperture 330 may be included in the electrical box 320. In conventional 4×4 electrical boxes, the ground screw aperture is typically on a raised surface 320f of the bottom 320e of the electrical box 320, as seen in FIGS. 24 and 25. The ground screw aperture 330 is typically a threaded or tapped hole for insertion of a ground screw, e.g., an 8/32 machine screw, that is typically color coded as green.

Continuing to refer to FIGS. 24-31, another exemplary embodiment of a cable connector assembly 350 according to the present disclosure includes a cable retaining member 352, a mounting member 354 and a cable stop 356. For ease of description the cable retaining member may be referred to as the "retaining member" in the singular and as the "retaining members" in the plural. The retaining member 352 may be provided in various shapes and sizes sufficient to flex while an electrical cable passes into the electrical box imparting little resistance to the forward advancement or movement of the cable while imparting sufficient resistance on the cable preventing rearward movement of the cable to prevent withdrawal of the cable from the electrical box. The area around the cable connector assembly 350 illustrated by the dashed lines is referred to herein as a cable receiving zone 357. The cable receiving zone 357 of the electrical box 320 is the area from a side wall of the electrical box in proximity to the cable connector assembly 350 where an electrical cable can be positioned for clamping a cable to the electrical box 320.

Figure 26:
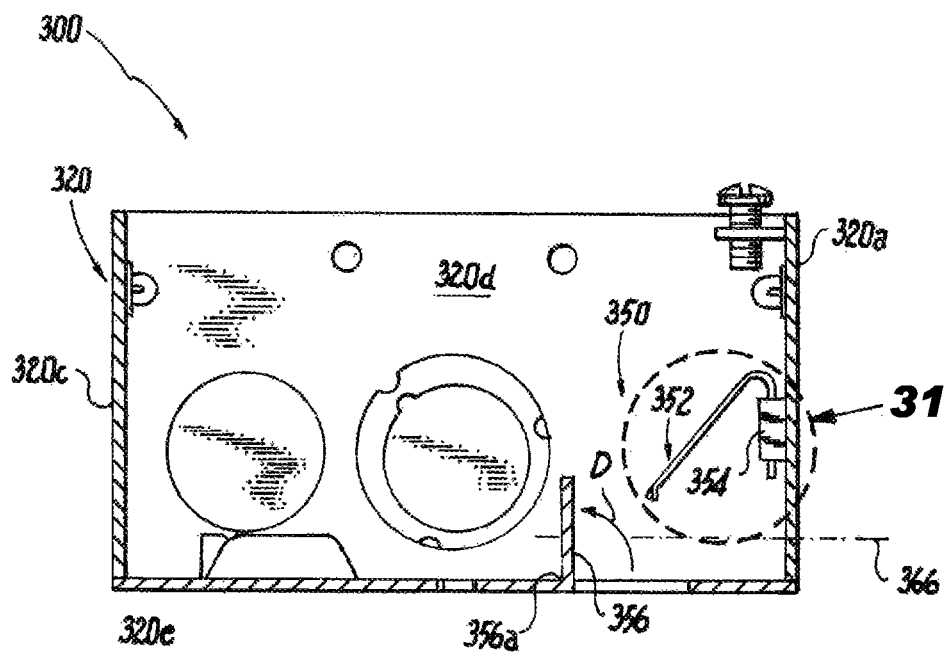
FIG. 26 is a cross-sectional view of the electrical box assembly of FIG. 25 taken from line 26-26 and illustrating another exemplary embodiment of a cable connector assembly according to the present disclosure.
Figure 27:
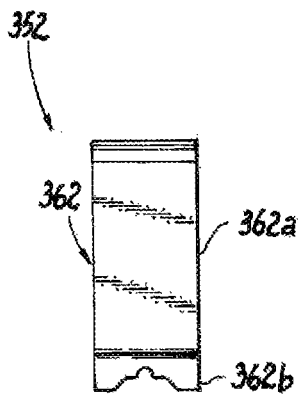
FIG. 27 is a front plan view of another exemplary embodiment of a retaining member of the cable connector assembly of FIG. 24.
Figure 28:
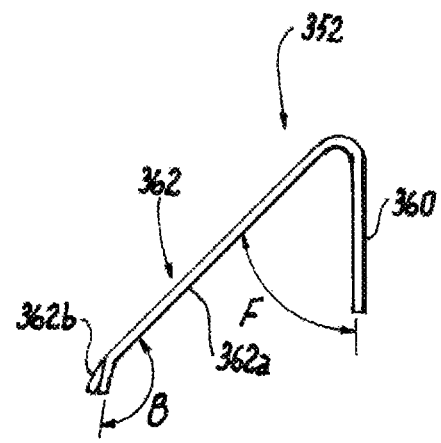
FIG. 28 is a side elevation view from the retaining member of FIG. 27.
Figure 29:
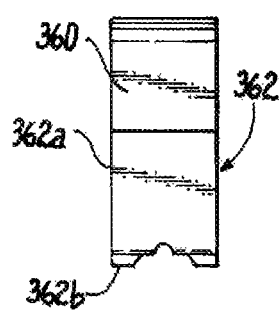
FIG. 29 is a rear elevation view of the retaining member of FIG. 27.
Figure 30:
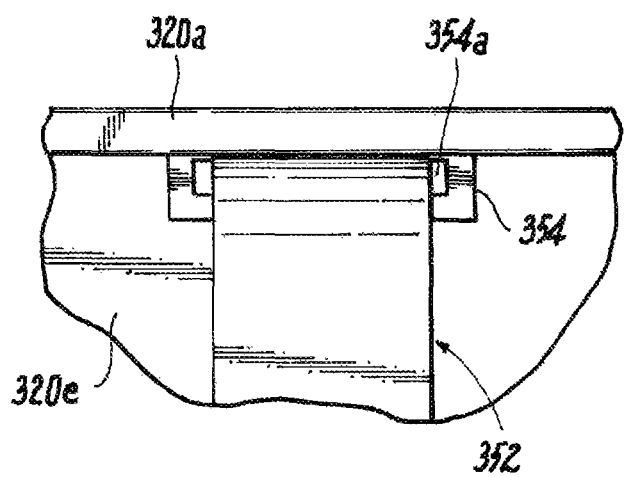
FIG. 30 is an enlarged top plan view of the connection between the electrical box and cable connector assembly of FIG. 25 taken from detail 30.
Figure 31:
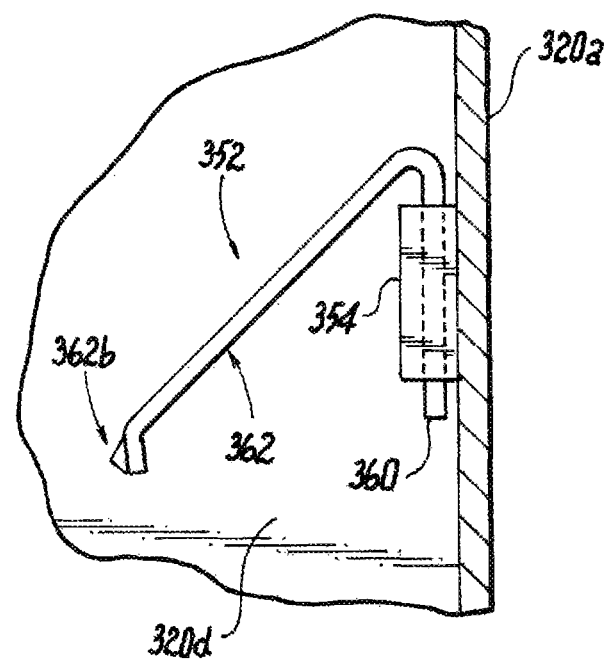
FIG. 31 is an enlarged side elevation view of the connection between the electrical box and cable connector assembly of FIG. 26 taken from detail 31.

Referring to FIGS. 27-29, an exemplary embodiment of the retaining member 352 includes a base portion 360 and one or more legs 362 extending from the base portion 360. In the exemplary embodiment shown in FIGS. 27-29, the retaining member 352 has a single leg 362 extending from or attached to the base portion 360. However, as noted above, the retaining member 352 may have more than on leg 362 extending from or attached to the base portion 360. The base portion 360 is generally straight and includes is used in releasably securing the retaining member 352 to a side wall, e.g., side wall 320a, of the electrical box 320 as described below. In this exemplary embodiment, each leg 362 has a substantially straight main body 362a that extends from the base portion 360 at an angle "F", and an end portion 362b that is at the angle "B" relative to the main body 362a. As such, the leg 362 is cantilevered from the base portion 360 at the point where the base portion 360 connects to the leg 362. This cantilever permits flexibility of the leg 362 relative to the base portion 360, which is releasably secured to the mounting bracket 354 attached to, integrally formed to or monolithically formed into a side wall, e.g., side wall 320a, of the electrical box 320. The angle "F" may depend upon a number of factors, including, the length of the leg 362 and the desired angle between the base portion 360 and a central axis 366 of the cable stop 356, seen in FIG. 26. As a non-limiting example, the angle "F" can be about 45 degrees, which provides suitable flexibility of the retaining member 352 to allow insertion of a cable into the electrical box 320 while imparting sufficient resistance on the cable preventing rearward movement of the cable to prevent withdrawal of the cable from the electrical box 320. The angle "B" may depend upon a number of factors, including the angle "F" and the angle between the base portion 360 and the central axis 366 of the cable stop 356. As a non-limiting example, the angle "B" can be about 145 degrees. The end portion 362b of the leg 362 may include a cable gripping portion 262c, seen in FIG. 21, that is configured to substantially conform to an outer periphery of the sheathing of an electrical cable, and to engage the sheathing of the electrical cable. The end portion 362b of the leg 362 engages the cable sheathing 520, seen in FIG. 32, to impart sufficient resistance on the cable preventing rearward movement of the cable 510 to prevent withdrawal of the cable from the electrical box.

In instances where more than one leg 362 extends from or are attached to the base portion 360, the legs 362 would be secured to the base portion 360 so that the long surfaces of each leg 362 are in parallel, and capable of flexing while an electrical cable passes through a pry-out opening described above into the electrical box 320, imparting little resistance to the forward advancement or movement of the cable 510 into the electrical box.

The retaining member 352 may be made of metal, e.g., steel or galvanized steel, or from non-metallic materials, such as plastic. An example of a suitable plastic material is injection molded thermoplastic. In addition, when using non-metallic cabling with a metallic retaining member 352, the end portions 362b of the legs 362 may include a protective coating to minimize damage to the non-metallic sheathing, such as a rubber or plastic coating. The retaining member 352 may be made as a single unitary member bent, stamped or molded to a desired size and shape, or the retaining member 352 may comprise a plurality of components joined together by, for example, welds or adhesives, to a size and shape sufficient to retain a cable within the electrical box 320.

Referring to FIG. 23, the end portion 362b of the leg 362 is aligned within the electrical box 320 so that it can flex when a cable 510 is passed through a pry-out opening into the cable receiving zone 357 of the electrical box 320 and is biased toward a normal state when the cable 510 is fully inserted such that the end portion 362b of leg 362 engages the cable sheathing 520 to impart sufficient resistance on the cable preventing rearward movement of the cable 510 so as to prevent withdrawal of the cable 510 from the electrical box 320. To accommodate cables having different outside diameters the cable retaining member 352 may include two legs 362. Each leg 362 can be configured so that the end portions 362b can extend into the cable receiving zone 357 and end at different height positions within the cable receiving zone, such that there is a height difference between the end portions 362b, similar to the embodiments shown in FIGS. 12 and 16. To remove the cable 510 from the electrical box 320, upward pressure can be applied to the legs 362 of each retaining member 352 so that the end portions 362b no longer engage the cable sheathing 520.

Referring to FIGS. 24, 26, 30 and 31, the mounting member 354 is configured and dimensioned to receive the base portion 360 of the retaining member 352 and to releasably hold the retaining member within the electrical box 320. In the exemplary embodiment shown, the mounting member may be a C-shaped or U-shaped structure attached to or integrally or monolithically formed into a side wall, e.g., side wall 320a, of the electrical box. In such a configuration, the mounting member 354 includes an opening 354a that permits the base portion 360 of the retaining member 352 to slide through the opening 354a. The base portion is releasably attached to the mounting member 354 by, for example, a wedge fit, a friction fit or a pressure fit where, for example, a detent extending from the base portion 360 of the retaining member 352 engages the side wall of the electrical box 320, or a detent extending from the side wall of the electrical box 320 engages the base portion 360 of the retaining member 352.

Figure 32:
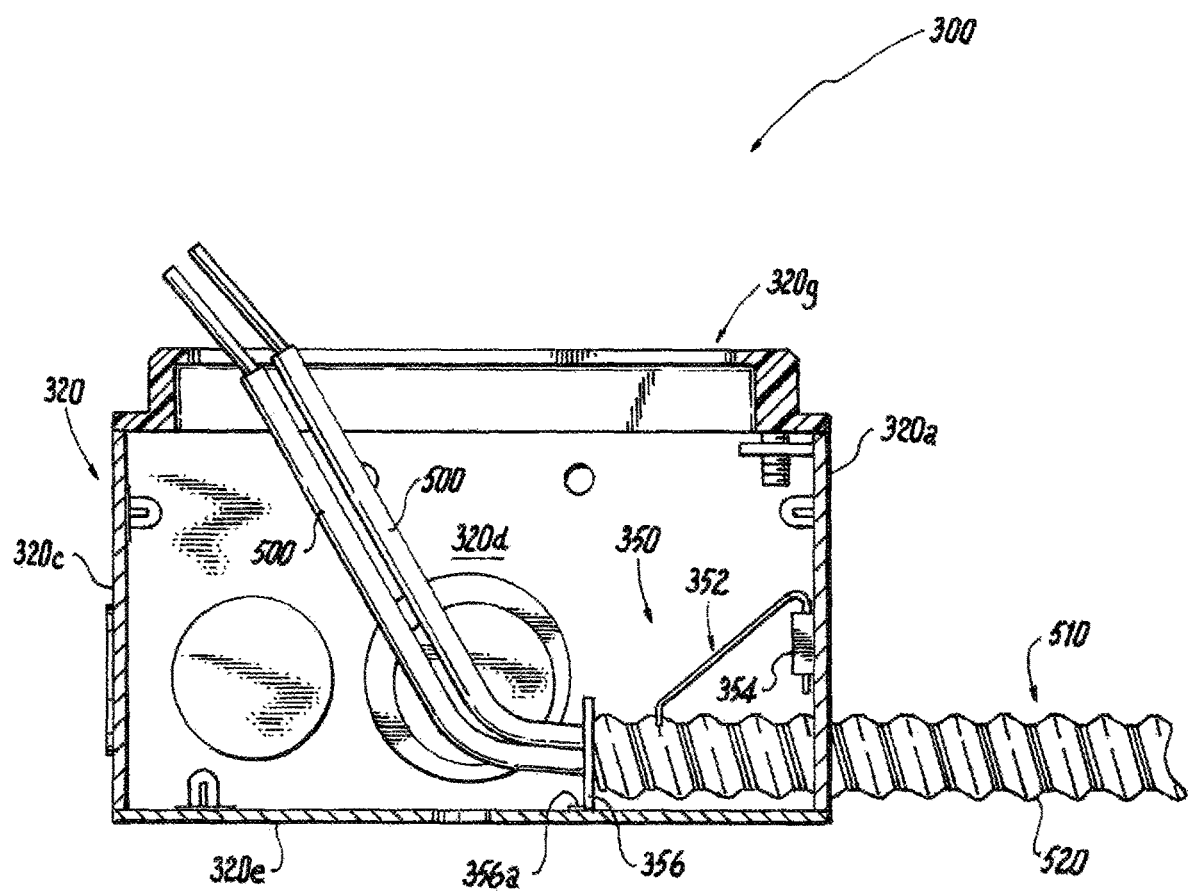
FIG. 32 is the cross-sectional view of the electrical box assembly of FIG. 26, illustrating a metallic sheath cable passing through a pry-out opening in a side wall of the electrical box and connected to the electrical box using the cable connector assembly.

Referring to FIGS. 24, 26 and 32, the cable stop 356 extends from the bottom wall 320e of the electrical box 320 and includes a wire opening 258 that permits electrical wires, e.g., wires 500, from an electrical cable 510 passing through a pry-out opening in a side wall, e.g., side wall 320a, of the electrical box 320 through the cable receiving zone 357 and further into the electrical box 320 for connection to other wires or an electrical device or fixture. The cable stop 356 may be secured to the bottom wall 320e of the electrical box 320 at the predefined angle "D", such as a 90 degree angle, or the cable stop 356 may be integrally or monolithically formed into the bottom wall 320e and includes a hinge 356a that permits the cable stop 356 to be manufactured and shipped so that the cable stop is in-line with the bottom wall 320e of the electrical box 320. The hinge 356a permits the cable stop 356 to be pivoted to the desired angle "D" in the field by the electrician. In this exemplary embodiment of the cable stop 356, the wire opening 358 is aligned with the center line 366, seen in FIG. 26, and includes a rounded edge 358a, seen in FIG. 24, around the periphery of the opening 358 to minimize potential damage to insulation surrounding wires 500 passing through the wire opening 358 as seen in FIG. 32. Alternatively, the wire opening 358 can include, for example, a rubber or plastic grommet to minimize potential damage to insulation surrounding wires 500 passing through the wire opening 358. The size of the wire opening 358 may vary depending upon a number of factors, including the number of wires 500 within the electrical cable 510 and the diameter of the sheathing 520 of the cable. The cable stop 356 acts as a stop to prevent the cable sheathing 520, e.g., armored electrical cable sheathing or non-metallic sheathing, from passing further into the electrical box 320. The wire opening 358 is aligned with the box pry-outs described above and seen in FIG. 3, when the cable stop 356 is set to its desired angle "D." As a result, a cable 510 can be passed through a pry-out opening into the cable receiving zone 357 of the electrical box 320, and the wires 500 within the cable 510 can pass through the wire opening 358 further into the electrical box, as seen in FIG. 32.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electrical box assembly comprising:
    an electrical box having a plurality of side walls, a bottom wall and at least one cable receiving zone; and
    at least one connector cable assembly including:

a mounting member integral with one of the plurality of side walls or the bottom wall;

a cable retaining member secured to the mounting member and having a cable gripping portion extending into the cable receiving zone; and a cable stop that is independent of the mounting member, the cable stop having a first end and a free second end, the first end being secured to or integral with the bottom wall or one of the plurality of side walls, and the free second end extending into the cable receiving zone, the cable stop being configured to permit one or more electrical wires from an electrical cable to pass through the cable stop while blocking sheathing of the electrical cable from passing through the cable stop;

wherein the cable gripping portion can engage the electrical cable when inserted into the cable receiving zone from an exterior of the electrical box so that the cable retaining member is able to flex while the electrical cable moves in the cable receiving zone imparting little resistance to the forward movement of the electrical cable within the cable receiving zone, while imparting sufficient resistance to rearward movement of the electrical cable to prevent withdrawal of the electrical cable from the cable receiving zone.

2. The electrical box assembly according to claim 1, wherein the cable retaining member comprises a base portion secured to the mounting member, and at least one leg extending from the base portion into the cable receiving zone.

3. The electrical box assembly according to claim 2, wherein the at least one leg includes the cable gripping portion for engaging the sheathing of the electrical cable.

4. The electrical box assembly according to claim 1, wherein the cable retaining member comprises a base portion secured to the mounting member, a first leg extending from one end of the base portion into the cable receiving zone and a second leg extending from another end of the base portion into the cable receiving zone.

5. The electrical box assembly according to claim 4, wherein the cable gripping portion includes a first cable gripping portion and a second cable gripping portion, and wherein the first leg includes the first cable gripping portion for engaging the sheathing of the electrical cable, and the second leg includes the second cable gripping portion for engaging the sheathing of a second electrical cable.

6. The electrical box assembly according to claim 1, wherein the cable retaining member is releasably secured to the mounting member by a fastener.

7. The electrical box assembly according to claim 6, wherein the fastener comprises a mechanical fastener.

8. The electrical box assembly according to claim 1, wherein the cable retaining member is releasably secured to the mounting member by a wedge fit, friction fit or pressure fit.

9. The electrical box assembly according to claim 1, wherein the cable retaining member is permanently secured to the mounting member or integrally formed into the mounting member.

10. The electrical box assembly according to claim 1, wherein the mounting member comprises a bracket.

11. The electrical box assembly according to claim 1, wherein the electrical box is made of a metallic material.

12. The electrical box assembly according to claim 1, wherein the electrical box is made of a non-metallic material.

13. The electrical box assembly according to claim 12, wherein the non-metallic material comprises injection molded thermoplastic.

14. An electrical box assembly comprising:

an electrical box having a plurality of side walls, a bottom wall and at least one cable receiving zone; and at least one connector cable assembly including:

a mounting member secured to or integral with one of the plurality of side walls or the bottom wall;

a cable retaining member having a base portion secured to the mounting member and at least one leg extending from the base portion such that at least a cable gripping portion of the leg is in the cable receiving zone; and a cable stop that is independent of the mounting member, the cable stop having a first end and a free second end, the first end being secured to or integral with the bottom wall or one of the plurality of side walls, and the free second end extending into the cable receiving zone, the cable stop being configured to permit one or more electrical wires from an electrical cable to pass through the cable stop while blocking sheathing of the electrical cable from passing through the cable stop;

wherein the cable gripping portion can engage the electrical cable when inserted into the cable receiving zone from an exterior of the electrical box so that the leg is able to flex while the electrical cable moves in the cable receiving zone imparting little resistance to the forward movement of the electrical cable within the cable receiving zone, while imparting sufficient resistance to rearward movement of the electrical cable to prevent withdrawal of the electrical cable from the cable receiving zone.

15. The electrical box assembly according to claim 14, wherein the at least one leg comprises a first leg extending from one end of the base portion and having a first cable gripping portion in the cable receiving zone and a second leg extending from another end of the base portion and having a second cable gripping portion in the cable receiving zone.

16. The electrical box assembly according to claim 14, wherein the base portion of the cable retaining member is releasably secured to the mounting member by a fastener.

17. The electrical box assembly according to claim 16, wherein the fastener comprises a mechanical fastener.

18. The electrical box assembly according to claim 14, wherein the cable retaining member is releasably secured to the mounting member by a wedge fit, friction fit or pressure fit.

19. The electrical box assembly according to claim 14, wherein the base portion of the cable retaining member is permanently secured to the mounting member or integrally formed into the mounting member.

20. The electrical box assembly according to claim 14, wherein the mounting member comprises a bracket.

21. The electrical box assembly according to claim 14, wherein the electrical box is made of a metallic material.

22. The electrical box assembly according to claim 14, wherein the electrical box is made of a non-metallic material.

23. The electrical box assembly according to claim 22, wherein the non-metallic material comprises injection molded thermoplastic.

24. An electrical box assembly comprising:

an electrical box having a plurality of side walls, a bottom wall and at least one cable receiving zone; and at least one connector cable assembly including:

a mounting member integral with one of the plurality of side walls or the bottom wall;

a cable retaining member secured to the mounting member and having a cable gripping portion extending into the cable receiving zone; and a cable stop that is independent of the mounting member, the cable stop having a first end and a free second end, the first end being integral with the bottom wall or one of the plurality of side walls, the cable stop and the free second end extending into the cable receiving zone, the cable stop being configured to permit one or more electrical wires from an electrical cable to pass through the cable stop while blocking sheathing of the electrical cable from passing through the cable stop;

wherein the cable gripping portion can engage the electrical cable when inserted into the cable receiving zone from an exterior of the electrical box so that the cable retaining member is able to flex while the electrical cable moves in the cable receiving zone imparting little resistance to the forward movement of the electrical cable within the cable receiving zone, while imparting sufficient resistance to rearward movement of the electrical cable to prevent withdrawal of the electrical cable from the cable receiving zone.

\* \* \* \* \*